United States Patent
Kawakami et al.

(10) Patent No.: US 8,003,006 B2
(45) Date of Patent: *Aug. 23, 2011

(54) DIFLUOROBENZENE DERIVATIVE AND NEMATIC LIQUID CRYSTAL COMPOSITION USING THE SAME

(75) Inventors: Shotaro Kawakami, Kumagaya (JP); Takashi Matsumoto, Kitaadachi-gun (JP); Tetsuo Kusumoto, Ageo (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 645 days.

This patent is subject to a terminal disclaimer.

(21) Appl. No.: 11/908,586

(22) PCT Filed: Mar. 15, 2006

(86) PCT No.: PCT/JP2006/305128
§ 371 (c)(1),
(2), (4) Date: Sep. 13, 2007

(87) PCT Pub. No.: WO2006/098366
PCT Pub. Date: Sep. 21, 2006

(65) Prior Publication Data
US 2009/0200514 A1    Aug. 13, 2009

(30) Foreign Application Priority Data

Mar. 17, 2005 (JP) .................. 2005-077026
May 31, 2005 (JP) .................. 2005-159224
Jun. 30, 2005 (JP) .................. 2005-191843

(51) Int. Cl.
*C09K 19/00* (2006.01)
*C09K 19/06* (2006.01)
*C09K 19/52* (2006.01)

(52) U.S. Cl. ......... 252/299.63; 252/299.01; 252/299.6; 428/1.1; 430/20; 349/1; 349/56; 349/182

(58) Field of Classification Search ......... 252/299.01, 252/299.1, 299.6; 428/1.1; 430/20; 349/1, 349/56, 182
See application file for complete search history.

(56) References Cited

U.S. PATENT DOCUMENTS

| | | | |
|---|---|---|---|
| 4,637,897 A | 1/1987 | Kelly | |
| 5,236,620 A | 8/1993 | Reiffenrath et al. | |
| 5,248,447 A | 9/1993 | Reiffenrath et al. | |
| 5,279,764 A | 1/1994 | Reiffenrath et al. | |
| 5,384,065 A | 1/1995 | Geelhaar et al. | |
| 5,599,480 A | 2/1997 | Tarumi et al. | |
| 6,180,027 B1 | 1/2001 | Kato et al. | |
| 6,190,576 B1 | 2/2001 | Andou et al. | |
| 6,376,030 B1 | 4/2002 | Heckmeier et al. | |
| 7,226,644 B2 | 6/2007 | Matsumoto et al. | |
| 7,651,630 B2 * | 1/2010 | Kawakami et al. | 252/299.6 |
| 7,670,504 B2 * | 3/2010 | Kawakami et al. | 252/299.01 |

FOREIGN PATENT DOCUMENTS

| | | |
|---|---|---|
| DE | 3906058 A1 | 9/1989 |
| EP | 0474062 A2 | 3/1992 |
| JP | 60-199840 A | 10/1985 |
| JP | 2-4725 A | 1/1990 |
| JP | 2-503568 A | 10/1990 |
| JP | 8-104869 A | 4/1996 |
| JP | 10-45639 A | 2/1998 |
| JP | 2000-96055 A | 4/2000 |
| WO | 9736847 A1 | 10/1997 |
| WO | 2005000995 A1 | 6/2005 |

OTHER PUBLICATIONS

S. M. Kelly; "Four unit linking groups III. Liquid crystals of negative dielectric anisotrypy"; Liquid Crystals, vol. 10, No. 2, pp. 261-272, 1991. Cited in the ISR.
H. Numata; "Technical Trend in Liquid Crystal Material"; Monthly Display, vol. 4, No. 3, pp. 1-7, 1998. (Please see Table 4 on p. 5).
International Search Report of PCT/JP2006/305128, date of mailing May 16, 2006.
European Search Report dated Nov. 18, 2009, issued in corresponding European Patent Application No. 06729149.2.
Shoichi Ishihara, Sharp Technical Journal, No. 24 (No. 92 of the old versions), pp. 11-16, Aug. 2005 (With partial English translation).

* cited by examiner

*Primary Examiner* — Geraldina Visconti
(74) *Attorney, Agent, or Firm* — Westerman, Hattori, Daniels & Adrian, LLP

(57) ABSTRACT

A nematic liquid crystal composition of the present invention includes one or at least two compounds represented by general formula (I) as a first component; and one or at least two compounds represented by general formula (II) as a second component, wherein a dielectric anisotropy is negative.

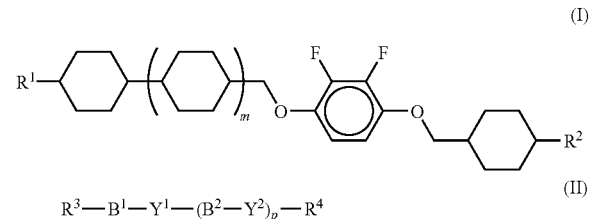

The use of this nematic liquid crystal composition can provide a highly reliable liquid crystal display element capable of maintaining a high voltage-holding ratio even in a high temperature region, and achieving quick responsiveness without reducing the cell gap.

12 Claims, No Drawings

DIFLUOROBENZENE DERIVATIVE AND NEMATIC LIQUID CRYSTAL COMPOSITION USING THE SAME

TECHNICAL FIELD

The present invention relates to a nematic liquid crystal composition having a negative dielectric anisotropy $\Delta \in$ which is useful as an electrooptic liquid crystal display material and a liquid crystal display element using the same.

BACKGROUND ART

Liquid crystal display elements have been used for various electrical household machineries and equipment such as a clock and a calculator, measuring equipments, panels for automobile, word processors, electronic notes, printers, computers, televisions, and the like. Typical liquid crystal display systems include TN (twisted nematic) type, STN (super twisted nematic) type, DS (dynamic light scattering) type, GH (guest-host) type, IPS (in-plane switching) type, OCB (optically compensated bend) type, ECB (electrically controlled birefringence) type, VA (vertical alignment) type, CSH (color super homeotropic) type, FLC (ferroelectric liquid crystal), and the like. Moreover, regarding a driving system, multiplex driving system has become typical from conventional static driving system, and simple matrix systems and recently active matrix (hereunder, referred to as "AM") systems in which driving is performed by TFT (thin film transistor), TFD (thin film diode), and the like, have been in the mainstream.

In these display systems, IPS type, ECB type, VA type, CSH type, and the like are different from TN type and STN type which are currently used for general purpose, and are characterized in that liquid crystal materials having a negative dielectric anisotropy ($\Delta \in$) are used. Of these, in particular, VA type display by means of AM driving is the most expected type at present in the application to display elements that require high-speed and wide-field angle, such as a television.

For liquid crystal materials used for display systems such as VA type, a low-voltage driving property, quick responsiveness, and a wide operating temperature range are required. That is, a negative dielectric anisotropy of a large absolute value, a low viscosity, and a high nematic phase-isotropic liquid phase transition temperature (Tni) are required. Therefore, in order to realize quick responsiveness, an attempt has been made to reduce the cell gap of display elements. However, in order to optimally set the retardation represented by the product ($\Delta n \times d$) of the refractive index anisotropy ($\Delta n$) and the cell gap (d), the refractive index anisotropy and the cell gap of a liquid crystal material have to be adjusted within appropriate ranges. Accordingly, narrowing of the cell gap has been limited. In order to improve the response speed without changing the cell gap, it is effective to use a liquid crystal composition with a low viscosity. If a liquid crystal display element is applied to a television or the like, since quick responsiveness is prioritized, the development of liquid crystal compositions having a low viscosity has been particularly in demand.

As a liquid crystal material having a negative dielectric anisotropy, liquid crystal compounds having a 2,3-difluorophenylene structure as follows are disclosed (refer to Patent Documents 1 and 2).

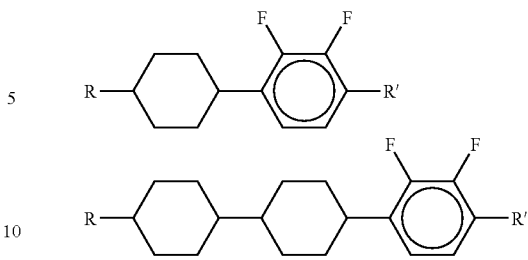

(wherein R and R' represent an alkyl group or an alkoxy group of 1 to 10 carbon atoms).

Furthermore, in these cited documents, compounds having a 1-hydroxy-2,3-difluoro-4-substituted benzene structure are disclosed. However, the compounds described in the cited documents are comprehensive in a wide range, and there is no specific disclosure of a compound having alkenyl groups at the both side chains. With liquid crystal compositions having a negative dielectric anisotropy using the described compounds, a sufficiently low viscosity has not been realized yet in liquid crystal compositions in which quick responsiveness is required for a liquid crystal television or the like.

On the other hand, there are disclosures of liquid crystal compositions using compounds having a 1-hydroxy-2,3-difluoro-4-substituted benzene structure serving as a basic structure of a liquid crystal compound constituting the invention of the present invention (refer to Patent Documents 3, 4, and 5). However there is no specific disclosure of a liquid crystal composition using a compound having alkenyl groups at the both side chains, and there is no specific disclosure of the type of compound to be used in addition to the concerned compound so as to reduce the viscosity of the liquid crystal composition.

Moreover, liquid crystal compounds having a 2,3-difluorohydroquinone structure have been already disclosed (refer to Patent Documents 6 and 7), and liquid crystal compositions using the concerned compound have been also disclosed. However, the concerned compound has a hydroquinone structure, and thus is considered to be unusable for an active matrix in the point of the voltage-holding ratio (refer to Non Patent Document 1), delaying the development of a liquid crystal composition having a low viscosity for VA using the concerned compound.

Liquid crystal compounds having 7,8-difluorochroman structure has been disclosed as a liquid crystal compound having a negative dielectric anisotropy of a large absolute value (refer to Patent Document 8). The liquid crystal compounds and the liquid crystal compositions thereof have a negative dielectric anisotropy of a large absolute value, but a viscosity is not sufficiently low. Accordingly, the development of a liquid crystal compound and a liquid crystal composition with a low viscosity is desired.

As a liquid crystal compound with a low viscosity, there is a compound having an alkenyl group as a side-chain, and many compounds have been already disclosed (refer to Patent Document 9). However, in this document, liquid crystal compounds and liquid crystal compositions having a positive dielectric anisotropy are taken in consideration, and there is no detailed disclosure on the following: what kind of compound is specifically used from among a lot of disclosed compounds for a liquid crystal composition having a negative dielectric anisotropy; what kind of compound is used together; and how the effect of the combination of compounds is.

Accordingly, the development of a liquid crystal composition having a negative dielectric anisotropy with a low viscosity is desired.

[Patent Document 1] Japanese Unexamined Patent Application, First Publication No. S60-199840
[Patent Document 2] Japanese Unexamined Patent Application, First Publication No. H2-4725
[Patent Document 3] Japanese Unexamined Patent Application, First Publication No. H8-104869
[Patent Document 4] Japanese Unexamined Patent Application, First Publication No. 2000-96055
[Patent Document 5] European Patent Application, Publication No. 0474062 (page 14)
[Patent Document 6] Published Japanese Translation No. H2-503568 of the PCT International Publication
[Patent Document 7] German Patent Application, Publication No. 3906058
[Patent Document 8] PCT International Publication No. WO2005/000995
[Patent Document 9] Japanese Unexamined Patent Application, First Publication No. H10-45639
[Non Patent Document 1] Hiroshi Numata, Monthly Display, Vol. 4, No. 3, pp. 1-7, (1998) (page 5, Table 4)

DISCLOSURE OF INVENTION

A problem to be solved by the present invention is to provide a nematic liquid crystal composition having a negative dielectric anisotropy of a large absolute value and a low viscosity with decreasing or without increasing the refractive index anisotropy. Also, a problem to be solved by the present invention is to provide a difluorobenzene derivative having a negative dielectric anisotropy and a low viscosity, which is a component of the aforementioned liquid crystal composition, and to provide a liquid crystal display element of VA type or the like using the aforementioned liquid crystal composition.

As a result of earnest investigation to solve the above problems, the present invention described as follows has been completed.

That is, the present invention provides a nematic liquid crystal composition, including:
one or at least two compounds represented by general formula (I) as a first component:

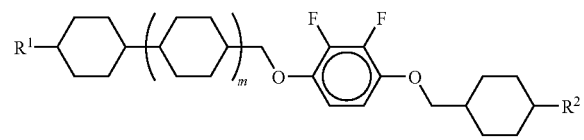

(I)

(wherein $R^1$ represents an alkyl group of 1 to 10 carbon atoms or an alkenyl group of 2 to 10 carbon atoms, in which one $CH_2$ group, or at least two $CH_2$ groups that are not adjacent, may be replaced by O and/or S, and one or at least two hydrogen atoms may be replaced by F or Cl;
$R^2$ represents an alkyl group of 1 to 10 carbon atoms, an alkoxyl group of 1 to 10 carbon atoms, an alkenyl group of 2 to 10 carbon atoms, or an alkenyloxy group of 3 to 10 carbon atoms; and
m represents 0, 1, or 2); and
one or at least two compounds represented by general formula (II) as a second component:

(II)

(wherein $R^3$ and $R^4$ each represent, independently, the same as $R^2$ in the general formula (I);
$B^1$ and $B^2$ each represent, independently, a group selected from the group consisting of
(a) a trans-1,4-cyclohexylene group (in which one $CH_2$ group, or at least two $CH_2$ groups that are not adjacent, may be replaced by an oxygen atom or a sulfur atom),
(b) a 1,4-phenylene group (in which one or at least two CH groups may be replaced by a nitrogen atom), and
(c) a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, and a 1,2,3,4-tetrahydronaphthalene-2,6-diyl group, in which a hydrogen atom of the above group (a), group (O), or group (c) may be replaced by CN or halogen;
$Y^1$ and $Y^2$ each represent, independently, —$CH_2CH_2$—, —CH=CH—, —$CH(CH_3)CH_2$—, —$CH_2CH(CH_3)$—, —$CH(CH_3)CH(CH_3)$—, —$CF_2CF_2$—, —CF=CF—, —$CH_2O$—, —$OCH_2$—, —$OCH(CH_3)$—, —$CH(CH_3)O$—, —$(CH_2)_4$—, —$(CH_2)_3O$—, —$O(CH_2)_3$—, —C≡C—, —$CF_2O$—, —$OCF_2$—, —COO—, —OCO—, —COS—, —SCO—, or a single bond;
in the case where pluralities of $Y^2$ and $B^2$ exist, a plurality of $Y^2$ or $B^2$ may be the same or different; and
p represents 0, 1, or 2), wherein
a dielectric anisotropy is negative.

Also, the present invention provides a difluorobenzene derivative, which is a component of the aforementioned nematic liquid crystal composition, represented by general formula (I-1):

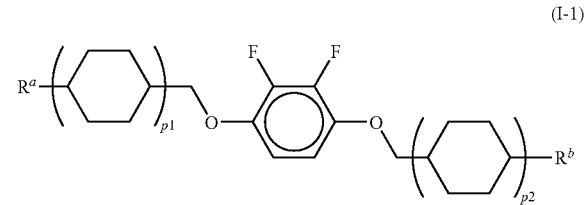

(I-1)

(wherein $R^a$ represents a linear alkenyl group of 2 to 7 carbon atoms, $R^b$ represents a linear alkyl group of 1 to 7 carbon atoms or a linear alkenyl group of 2 to 7 carbon atoms, and p1 and p2 each represent, independently, 1 or 2 in which the sum of p1 and p2 is 3 or less).

Furthermore, the present invention provides a liquid crystal display element using the aforementioned nematic liquid crystal composition.

Due to the combination of liquid crystal compounds of the present invention, a nematic liquid crystal composition having a negative dielectric anisotropy with a low viscosity can be obtained while substantially maintaining the refractive index anisotropy. The use of this nematic liquid crystal composition can provide a highly reliable liquid crystal display element capable of maintaining a high voltage-holding ratio even in a high temperature region, and achieving quick responsiveness without reducing the cell gap. This liquid crystal display element is very useful as a liquid crystal display of VA type, ECB type, IPS type, or the like.

Also, a difluorobenzene derivative of the present invention has a negative dielectric anisotropy and a low viscosity, and so is useful as a component of a nematic liquid crystal composition of the present invention.

BEST MODE FOR CARRYING OUT THE INVENTION

The nematic liquid crystal composition in the present invention includes either one or at least two compounds represented by general formula (I) as a first component. However the number of the compounds is preferably 1 to 20, more preferably 1 to 15, yet more preferably 1 to 10, and particularly preferably 2 to 8.

The content of compounds represented by general formula (I) is preferably within the range of 10 to 80% by mass, more preferably within the range of 15 to 70% by mass. These compounds have a negative dielectric anisotropy of a large absolute value. However, if the amount of content is large, the viscosity tends to be increased, or the smectic-nematic phase transition temperature may be increased. Therefore, the content ratio thereof is preferably low when the low viscosity is prioritized, or when the low smectic-nematic phase transition temperature is prioritized, and the content ratio thereof is preferably high when the negative dielectric anisotropy of a large absolute value is prioritized.

In general formula (I), $R^1$ and $R^2$ represent an alkyl group of 1 to 10 carbon atoms or an alkenyl group of 2 to 10 carbon atoms, and it is preferable that at least one of $R^1$ and $R^2$ represent an alkenyl group of 2 to 10 carbon atoms, and the following specific structures (1) to (5) are particularly preferable as an alkenyl group:

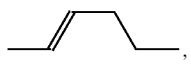  (1)

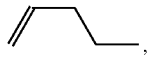  (2)

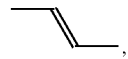  (3)

  (4)

  (5)

(The right terminal of the above structural formulas is connected to the ring).

In more detail, preferably the general formula (I) represents a compound represented by the following general formula (I-A) and general formula (I-B) as a specific structure:

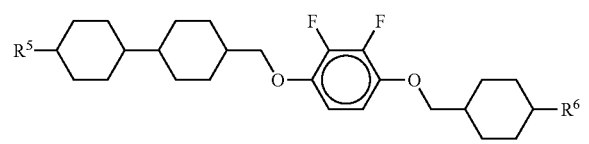  (I-A)

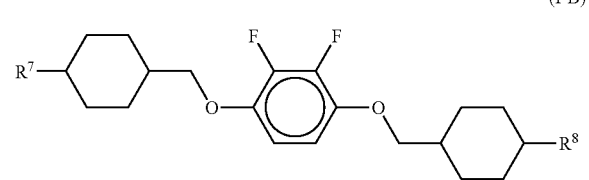  (I-B)

(wherein $R^5$, $R^6$, $R^7$, and $R^8$ each represent the same as $R^2$ in the general formula (I)).

More preferably, the general formula (I) represents a compound represented by the group consisting of general formulas (I-A-I) through (I-A-VIII) and general formulas (I-B-I) through (I-B-IV):

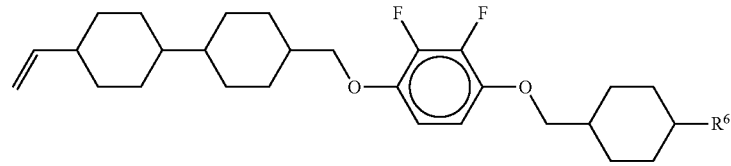  (I-A-I)

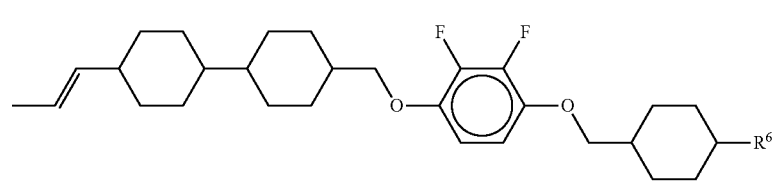  (I-A-II)

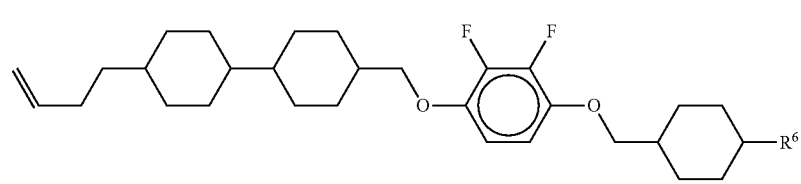  (I-A-III)

-continued
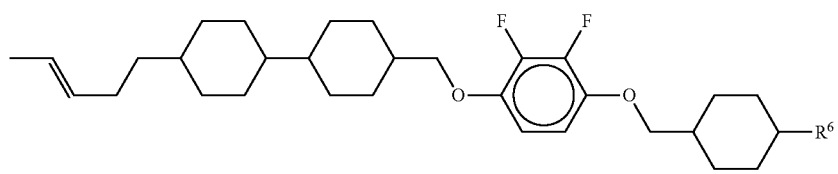
(I-A-IV)
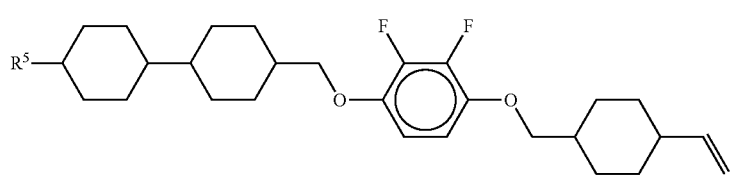
(I-A-V)
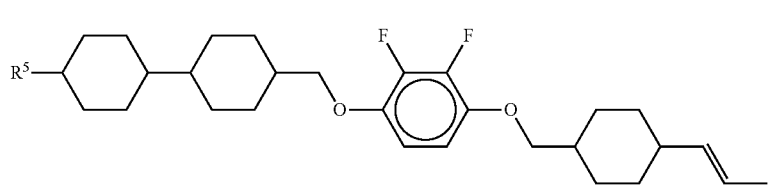
(I-A-VI)
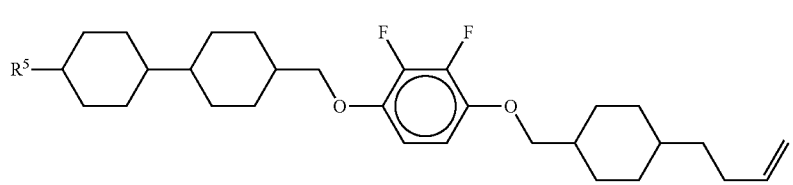
(I-A-VII)
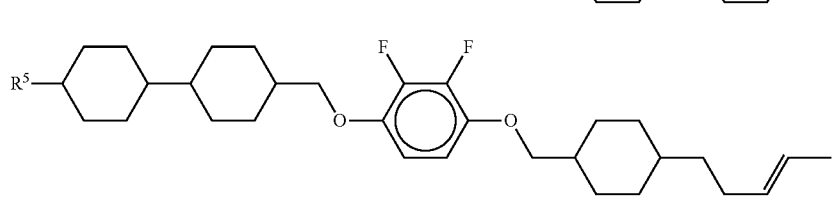
(I-A-VIII)
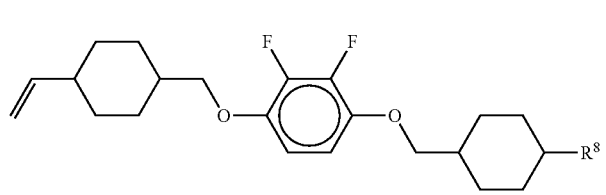
(I-B-I)
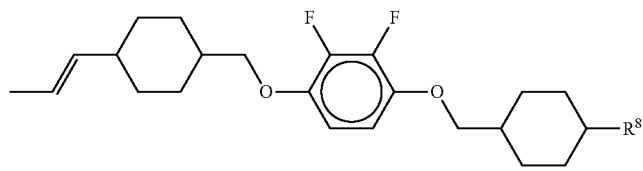
(I-B-II)
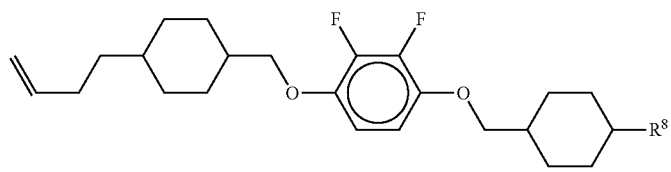
(I-B-III)
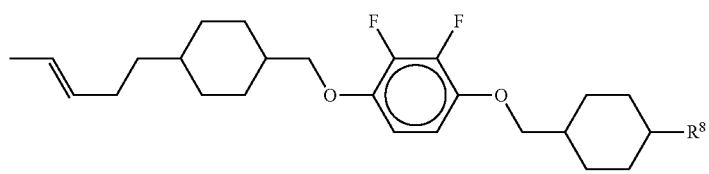
(I-B-IV)

(wherein $R^5$, $R^6$, and $R^5$ represent an alkyl group of 1 to 10 carbon atoms or an alkenyl group of 2 to 10 carbon atoms), The nematic liquid crystal composition in the present invention includes either one or at least two compounds represented by general formula (II) as a second component; however, the number of the compounds is preferably 1 to 12, more preferably 1 to 8, and yet more preferably 2 to 6.

The content of compounds represented by general formula (II) is preferably within the range of 20 to 70% by mass, more preferably within the range of 25 to 65% by mass. These compounds have an effect of reducing the viscosity although there is almost no effect of increasing the absolute value of the dielectric anisotropy. Therefore, the content ratio thereof is preferably high when the low viscosity is prioritized, and the content ratio thereof is preferably low when the increase of the absolute value of the dielectric anisotropy is prioritized.

In the present invention, the total of the content ratios of the first component and the second component does not exceed 100% by mass.

In general formula (II), preferably $R^3$ and $R^4$ each represent, independently, an alkyl group of 1 to 10 carbon atoms, an alkenyl group of 2 to 10 carbon atoms, an alkoxy group of 1 to 10 carbon atoms, or an alkenyloxy group of 3 to 10 carbon atoms, more preferably $R^3$ represents an alkyl group of 1 to 10 carbon atoms or an alkenyl group of 2 to 10 carbon atoms, and $R^4$ represents an alkyl group of 1 to 10 carbon atoms, an alkoxy group of 1 to 10 carbon atoms, or an alkenyl group of 2 to 10 carbon atoms.

Specifically, it is more preferable that $R^3$ represent —CH$_3$, —CH$_2$CH$_3$, —(CH$_2$)$_2$CH$_3$, —(CH$_2$)$_3$CH$_3$, —(CH$_2$)$_4$CH$_3$, —(CH$_2$)$_5$CH$_3$, —(CH$_2$)$_6$CH$_3$, —(CH$_2$)$_7$CH$_3$, —CH=CH$_2$, —CH=CHCH$_3$ (E-form), —(CH$_2$)$_2$CH=CH$_2$, —(CH$_2$)$_2$CH=CHCH$_3$ (E-form), —(CH$_2$)$_4$CH=CH$_2$, —(CH$_2$)$_4$CH=CHCH$_3$ (E-form), or —(CH$_2$)$_6$CH=CH$_2$, and $R^4$ represents —CH$_3$, —CH$_2$CH$_3$, —(CH$_2$)$_2$CH$_3$, —(CH$_2$)$_3$CH$_3$, —(CH$_2$)$_4$CH$_3$, —(CH$_2$)$_5$CH$_3$, —(CH$_2$)$_6$CH$_3$, —(CH$_2$)$_7$CH$_3$, —OCH$_3$, —OCH$_2$CH$_3$, —O(CH$_2$)$_2$CH$_3$, —O(CH$_2$)$_3$CH$_3$, —O(CH$_2$)$_4$CH$_3$, —O(CH$_2$)$_5$CH$_3$, —O(CH$_2$)$_6$CH$_3$, —O(CH$_2$)$_7$CH$_3$, —CH=CH$_2$, —CH=CHCH$_3$ (E-form), —(CH$_2$)$_2$CH=CH$_2$, —(CH$_2$)$_2$CH=CHCH$_3$ (E-form), —(CH$_2$)$_4$CH=CH$_2$, —(CH$_2$)$_4$CH=CHCH$_3$ (E-form), or —(CH$_2$)$_6$CH=CH$_2$.

Preferably $B^1$ and $B^2$ each represent, independently, trans-1,4-cyclohexylene group (including those in which one CH$_2$ group, or at least two CH$_2$ groups that are not adjacent, are replaced by an oxygen atom or a sulfur atom), 1,4-phenylene group (including those in which one CH group or at least two CH groups are replaced by a nitrogen atom), 1,4-cyclohexenylene group, 1,4-bicyclo[2.2.2]octylene group, piperidine-1,4-diyl group, naphthalene-2,6-diyl group, decahydronaphthalene-2,6-diyl group, 1,2,3,4-tetrahydronaphthalene-2,6-diyl group, or a substituent thereof in which a hydrogen atom is substituted with a fluorine atom, more preferably trans-1,4-cyclohexylene group, 1,4-phenylene group, fluorine-substituted 1,4-phenylene group, or 1,4-bicyclo[2.2.2]octylene group, and particularly preferably trans-1,4-cyclohexylene group, or 1,4-phenylene group.

Preferably $Y^1$ and $Y^2$ each represent, independently, —CH$_2$CH$_2$—, —CH=CH— (E-form), —CH(CH$_3$)CH$_2$—, —CH$_2$CH(CH$_3$)—, —CH(CH$_3$)CH(CH$_3$)—, —CF$_2$CF$_2$—, —CF=CF— (E-form), —CH$_2$O—, —OCH$_2$—, —OCH(CH$_3$)—, —CH(CH$_3$)O—, —(CH$_2$)$_4$—, —(CH$_2$)$_3$O—, —O(CH$_2$)$_3$—, —C≡C—, —CF$_2$O—, —OCF$_2$—, —COO—, —OCO—, —COS—, —SCO—, or a single bond, more preferably —CH$_2$CH$_2$—, —CH=CH— (E-form), —CH(CH$_3$)CH$_2$—, —CH$_2$CH(CH$_3$)—, —CF$_2$CF$_2$—, —CF=CF— (E-form), —CH$_2$O—, —OCH$_2$—, —OCH(CH$_3$)—, —CH(CH$_3$)O—, —C≡C—, —CF$_2$O—, —OCF$_2$—, or a single bond, and yet more preferably —CH$_2$CH$_2$—, —CH=CH— (E-form), or a single bond.

In more detail, preferably the general formula (II) represents a compound represented by the following general formula (II-A) through general formula (II-I) as a specific structure:

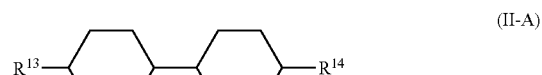
(II-A)

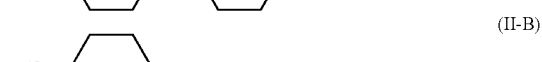
(II-B)

(II-C)

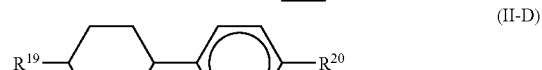
(II-D)

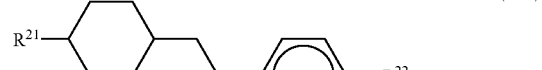
(II-E)

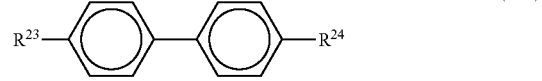
(II-F)

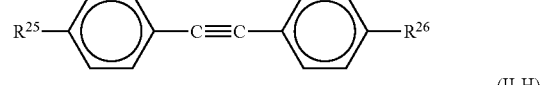
(II-G)

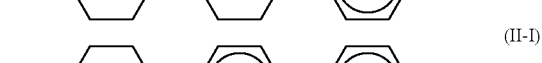
(II-H)

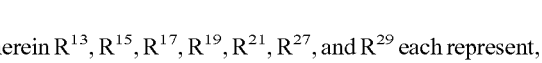
(II-I)

(wherein $R^{13}$, $R^{15}$, $R^{17}$, $R^{19}$, $R^{21}$, $R^{27}$, and $R^{29}$ each represent, independently, —CH$_3$, —CH$_2$CH$_3$, —(CH$_2$)$_2$CH$_3$, —(CH$_2$)$_3$CH$_3$, —(CH$_2$)$_4$CH$_3$, —(CH$_2$)$_5$CH$_3$, —(CH$_2$)$_6$CH$_3$, —(CH$_2$)$_7$CH$_3$, —CH=CH$_2$, —CH=CHCH$_3$ (E-form), —(CH$_2$)$_2$CH=CH$_2$, —(CH$_2$)$_2$CH=CHCH$_3$ (E-form), —(CH$_2$)$_4$CH=CH$_2$, —(CH$_2$)$_4$CH=CHCH$_3$ (E-form), or —(CH$_2$)$_6$CH=CH$_2$;

$R^{23}$ and $R^{25}$ each represent, independently, —CH$_3$, —CH$_2$CH$_3$, —(CH$_2$)$_2$CH$_3$, —(CH$_2$)$_3$CH$_3$, —(CH$_2$)$_4$CH$_3$, —(CH$_2$)$_5$CH$_3$, —(CH$_2$)$_6$CH$_3$, —(CH$_2$)$_7$CH$_3$, —(CH$_2$)$_2$CH=CH$_2$, —(CH$_2$)$_2$CH=CHCH$_3$ (E-form), —(CH$_2$)$_4$CH=CH$_2$, —(CH$_2$)$_4$CH=CHCH$_3$ (E-form), or —(CH$_2$)$_6$CH=CH$_2$;

$R^{14}$, $R^{16}$, and $R^{18}$ each represent, independently, —CH$_3$, —CH$_2$CH$_3$, —(CH$_2$)CH$_3$, —(CH$_2$)$_3$CH$_3$, —(CH$_2$)$_4$CH$_3$, —(CH$_2$)$_5$CH$_3$, —(CH$_2$)$_6$CH$_3$, —(CH$_2$)$_7$CH$_3$, —OCH$_3$, —OCH$_2$CH$_3$, —O(CH$_2$)$_2$CH$_3$, —O(CH$_2$)$_3$CH$_3$, —O(CH$_2$)$_4$CH$_3$, —O(CH$_2$)$_5$CH$_3$, —O(CH$_2$)$_6$CH$_3$, —O(CH$_2$)$_7$CH$_3$, —CH=CH$_2$, —CH=CHCH$_3$ (E-form), —(CH$_2$)$_2$CH=CH$_2$, —(CH$_2$)$_2$CH=CHCH$_3$ (E-form), —(CH$_2$)$_4$CH=CH$_2$, —(CH$_2$)$_4$CH=CHCH$_3$ (E-form), or —(CH$_2$)$_6$CH=CH$_2$; and
$R^{20}$, $R^{22}$, $R^{24}$, $R^{26}$, $R^{28}$, and $R^{30}$ each represent, independently, —CH$_3$, —CH$_2$CH$_3$, —(CH$_2$)$_2$CH$_3$, —(CH$_2$)$_3$CH$_3$, —(CH$_2$)$_4$CH$_3$, —(CH$_2$)$_5$CH$_3$, —(CH$_2$)$_6$CH$_3$, —(CH$_2$)$_7$CH$_3$, —OCH$_3$, —OCH$_2$CH$_3$, —O(CH$_2$)$_2$CH$_3$, —O(CH$_2$)$_3$CH$_3$, —O(CH$_2$)$_4$CH$_{13}$, —O(CH$_2$)$_5$CH$_3$, —O(CH$_2$)$_6$CH$_3$, —O(CH$_2$)$_7$CH$_3$, —(CH$_2$)$_2$CH=CH$_2$, —(CH$_2$)$_2$CH=CHCH$_3$ (E-form), —(CH$_2$)$_4$CH=CH$_2$, —(CH$_2$)$_4$CH=CHCH$_3$ (E-form), or —(CH$_2$)$_6$CH=CH$_2$)

Moreover, it is also preferable that a nematic liquid crystal composition of the present invention includes either one or at least two compounds selected from the group of compounds represented by general formula (III-A) through general formula (III-J), as an additional component:

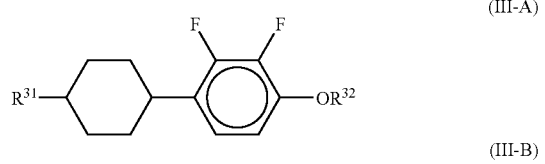
(III-A)

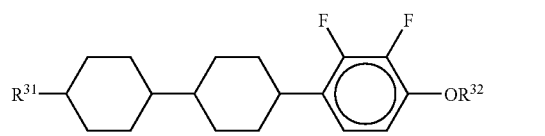
(III-B)

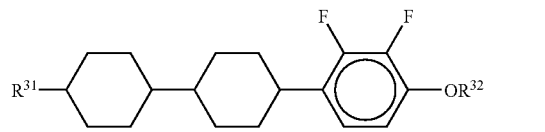
(III-C)

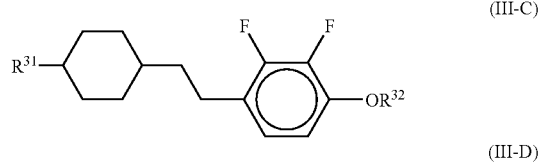
(III-D)

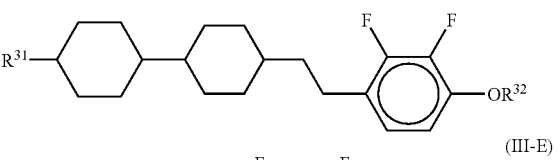
(III-E)

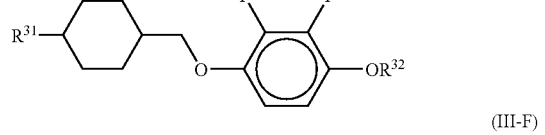
(III-F)

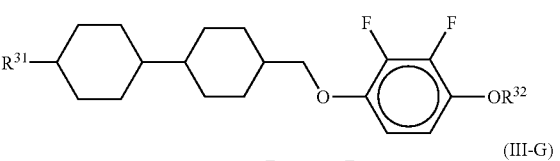
(III-G)

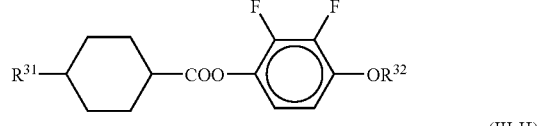
(III-H)

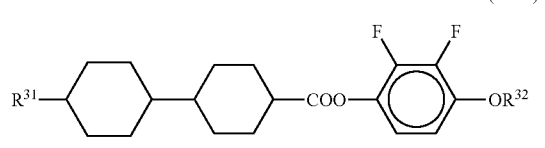

-continued

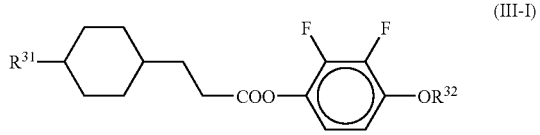
(III-I)

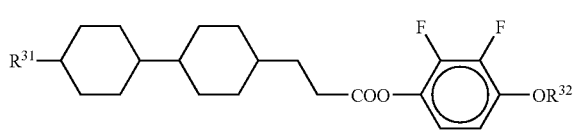
(III-J)

(wherein $R^{31}$ and $R^{32}$ each represent, independently, an alkyl group of 1 to 10 carbon atoms or an alkenyl group of 2 to 10 carbon atoms, in which one CH$_2$ group, or at least two CH$_2$ groups that are not adjacent, may be replaced by O and/or S, and one or at least two hydrogen atoms may be replaced by F or Cl).

Preferably, a nematic liquid crystal composition of the present invention includes: 10 to 80% by mass of either one or at least two compounds selected from the group of compounds represented by general formula (I); and 20 to 70% by mass of either one or at least two compounds selected from the group of compounds represented by general formula (II-A) through general formula (II-I).

Also, a nematic liquid crystal composition of the present invention more preferably includes: 10 to 80% by mass of either one or at least two compounds selected from the group of compounds represented by general formula (I-A) and general formula (I-B); and 20 to 70% by mass of either one or at least two compounds selected from the group of compounds represented by general formula (II-A) through general formula (II-I).

Also, a nematic liquid crystal composition of the present invention more preferably includes: 10 to 80% by mass of either one or at least two compounds selected from the group of compounds represented by general formula (I-A-I) through general formula (I-A-VIII) and general formula (I-B-I) through general formula (I-B-IV); and 20 to 70% by mass of either one or at least two compounds selected from the group of compounds represented by general formula (II-A) through general formula (II-I).

In the present invention, the nematic phase-isotropic liquid phase transition temperature (Tni) is preferably 70° C. or more, more preferably 75° C. or more, and yet more preferably 80° C. or more. Since the nematic phase-isotropic liquid phase transition temperature (Tni) is preferably as high as possible, it is not necessary to particularly limit the upper limit thereof. However, the practical upper limit can be set, for example to 130° C.

The dielectric anisotropy (Δ∈) at 25° C. is preferably −2.0 or less, more preferably −2.5 or less, and yet more preferably −3.0 or less. Since the absolute value of the dielectric anisotropy (Δ∈) is preferably as large as possible, it is not necessary to particularly limit the lower limit thereof. However, the practical lower limit can be set, for example to −8.0.

The refractive index anisotropy (Δn) at 25° C. is preferably 0.10 or more, and more preferably 0.12, when a thin cell gap is dealt with. The refractive index anisotropy (Δn) at 25° C. is more preferably 0.095 or less, and even more preferably 0.085 or less, when a thick cell gap is dealt with. Since the refractive index anisotropy (Δn) is adjusted according to the respective optimum value of the retardation represented by the product (Δn×d) of the refractive index anisotropy (Δn) and the cell gap (d), it is not necessary to particularly limit the range thereof. However, the practical range can be set, for example, between 0.06 or more and 0.16 or less.

The viscosity is preferably 30 mPa·s or less, and more preferably 25 mPa·s or less, and yet more preferably 20 mPa·s or less. Since the viscosity is preferably as low as possible, it is not necessary to particularly limit the lower limit thereof. However, the practical lower limit can be set, for example to 10 mPa·s.

The above nematic liquid crystal composition is useful for liquid crystal display elements, in particular liquid crystal display elements for active matrix driving, and may be used for liquid crystal display elements for VA mode, IPS mode, or ECB mode.

The nematic liquid crystal composition of the present invention may contain normal nematic liquid crystals, smectic liquid crystals, cholesteric liquid crystals, and the like, in addition to the abovementioned compounds.

In a compound represented by general formula (I-1), which constitutes the present invention, $R^a$ represents a linear alkenyl group of 2 to 7 carbon atoms, and preferably represents —CH=CH$_2$, —CH=CHCH$_3$ (E-form), —(CH$_2$)$_2$CH=CH$_2$, —(CH$_2$)$_2$CH=CHCH$_3$ (E-form), —(CH$_2$)$_4$CH=CH$_2$, or —(CH$_2$)$_4$CH=CHCH$_3$ (E-form).

$R^b$ represents a linear alkyl group of 1 to 7 carbon atoms or a linear alkenyl group of 2 to 7 carbon atoms. Preferable examples of a linear alkyl group of 1 to 7 carbon atoms include an ethyl group, a propyl group, a butyl group, and pentyl group, and preferable examples of a linear alkenyl group of 2 to 7 carbon atoms include —CH=CH$_2$, —CH=CHCH$_3$ (E-form), —(CH$_2$)$_2$CH=CH$_2$, —(CH$_2$)$_2$CH=CHCH$_3$ (E-form), —(CH$_2$)$_4$CH=CH$_2$, and —(CH$_2$)$_4$CH=CHCH$_3$ (E-form).

In detail, a compound represented by general formula (I-1) preferably represents the following structures:

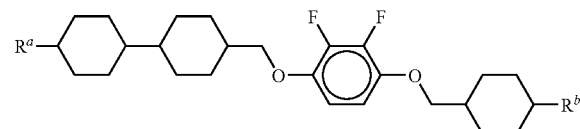

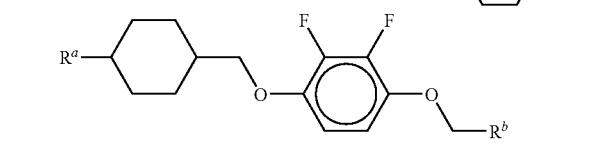

(wherein $R^a$ represents —CH=CH$_2$, —CH=CHCH$_3$ (E-form), —(CH$_2$)$_2$CH=CH$_2$, —(CH$_2$)$_2$CH=CHCH$_3$ (E-form), —(CH$_2$)$_4$CH=CH$_2$, or —(CH$_2$)$_4$CH=CHCH$_3$ (E-form), $R^b$ represents a linear alkyl group of 1 to 5 carbon atoms or —CH=CH$_2$, —CH=CHCH$_3$ (E-form), —(CH$_2$)$_2$CH=CH$_2$, —(CH$_2$)$_2$CH=CHCH$_3$ (E-form), —(CH$_2$)$_4$CH=CH$_2$, or —(CH$_2$)$_4$CH=CHCH$_3$ (E-form)).

A compound of the present invention can be produced as follows.

(Process 1)

A diketone compound represented by formula (9):

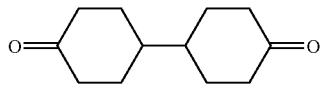

is reacted with an ylide prepared from methoxymethyl triphenylphosphonium chloride, to yield a compound represented by formula (10):

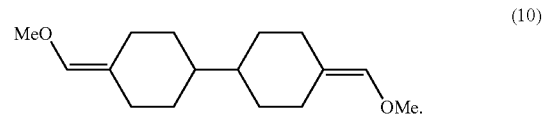

The obtained compound of formula (10) is subjected to acid catalytic hydrolysis, and further cis-trans isomerization under a basic condition, to thereby obtain a compound represented by formula (11):

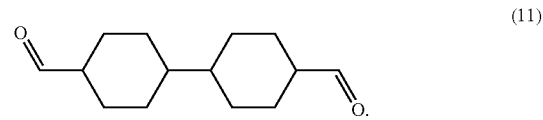

The obtained compound of formula (11) is reacted with an ylide prepared from methyl triphenylphosphonium bromide, to obtain a compound represented by formula (12):

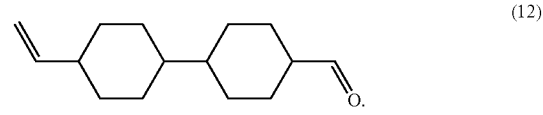

The obtained compound of formula (12) is reduced using a reductant such as sodium boron hydride, to obtain a compound represented by formula (13):

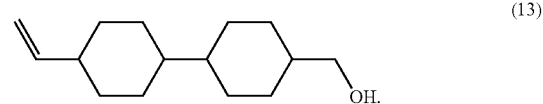

The obtained compound of formula (13) is converted into a compound represented by general formula (14):

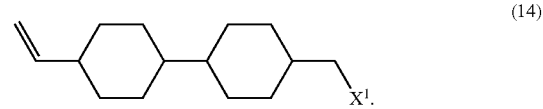

(wherein $X^1$ represents a chlorine atom, a bromine atom, an iodine atom, a benzenesulfonyloxy group, a p-toluenesulfonyloxy group, a methanesulfonyloxy group, or a trifluoromethanesulfonyloxy group), and reacted with a phenolate prepared from 2,3-difluorophenol, to thereby obtain a compound represented by formula (15):

(15)

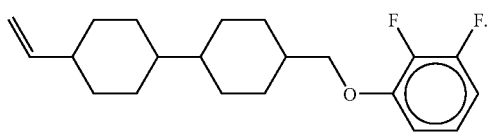

This compound is oxidized, to thereby obtain a compound represented by formula (16):

(16)

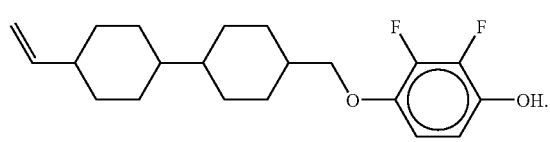

A phenolate prepared from this compound is reacted with a compound represented by general formula (17):

(17)

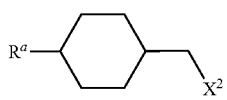

(wherein $R^a$ represents the same meaning as in the general formula (I-1), and $X^2$ represents the same meaning as $X^1$ in the general formula (14)), and thereby a compound represented by general formula (18) can be obtained:

(18)

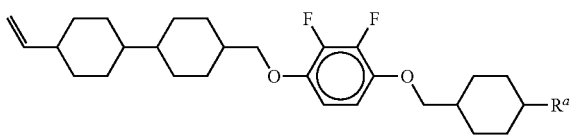

(wherein $R^a$ represents the same meaning as in the general formula (I-1)).

(Process 2)

A compound represented by formula (19):

(19)

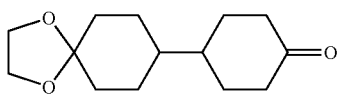

is subjected to a similar reaction to the conversion from formula (9) into formula (11), to thereby obtain a compound represented by formula (20):

(20)

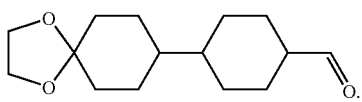

The obtained compound of formula (20) is reduced using a reductant such as sodium boron hydride, to obtain a compound represented by formula (21):

(21)

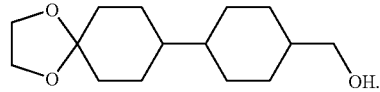

The obtained compound represented by formula (21) is converted into a compound represented by general formula (22):

(22)

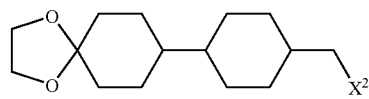

(wherein $X^2$ represents the same meaning as $X^1$ in general formula (14)), and deprotected under an acidic condition, to thereby obtain a compound represented by general formula (23):

(23)

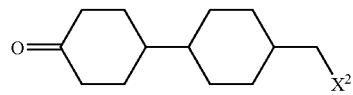

(wherein $X^2$ represents the same meaning as $X^1$ in general formula (14)). The obtained compound represented by general formula (23) is subjected to a similar reaction to the conversion from formula (9) into formula (11), to thereby obtain a compound represented by formula (24):

(24)

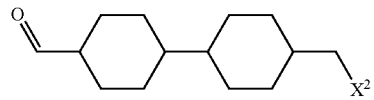

(wherein $X^2$ represents the same meaning as $X^1$ in general formula (14)). The obtained compound represented by general formula (24) is reacted with an ylide prepared from methyl triphenylphosphine bromide, to obtain a compound represented by general formula (25):

(25)

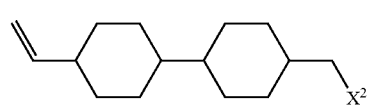

(wherein $X^2$ represents the same meaning as $X^1$ in general formula (14)). The obtained compound represented by general formula (25) is reacted with a phenolate prepared from a phenol compound represented by general formula (26):

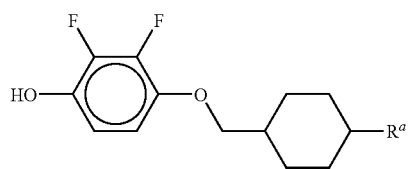

(26)

(wherein R$^a$ represents the same meaning as in the general formula (I-1)), and thereby a compound represented by general formula (18) can be obtained.

(Process 3)

A compound represented by formula (27):

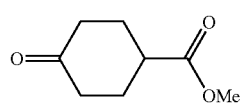

(27)

is subjected to a similar reaction to the conversion from formula (9) into formula (12), to thereby obtain a compound represented by formula (28):

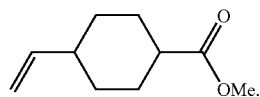

(28)

The obtained compound represented by formula (28) is reduced using a reductant such as lithium aluminum hydride or sodium bis(2-methoxyethoxy)aluminum hydride, to obtain a compound represented by formula (29):

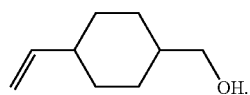

(29)

The obtained compound represented by formula (29) is converted into a compound represented by general formula (30):

(30)

(wherein X$^3$ represents the same meaning as X$^1$ in the general formula (14)), and reacted with a phenolate prepared from a phenol compound represented by formula (26), and thereby a compound represented by formula (31):

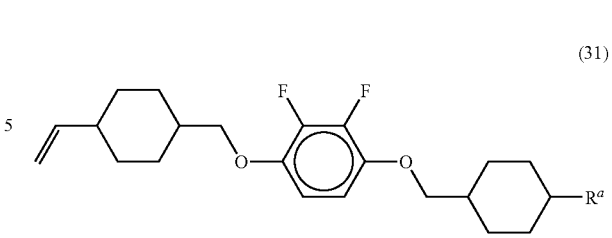

(31)

(wherein R$^a$ represents the same meaning as in the general formula (I-1)) can be obtained.

(Process 4)

A compound represented by formula (39):

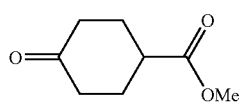

(39)

is reacted with ethylene glycol under acidic and dewatering conditions, to obtain a compound represented by formula (40):

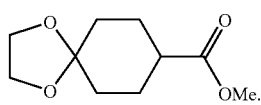

(40)

The obtained compound represented by formula (40) is reduced using a reductant such as lithium aluminum hydride or sodium bis(2-methoxyethoxy)aluminum hydride, to obtain a compound represented by formula (41):

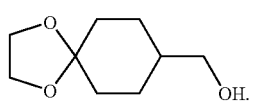

(41)

The obtained compound represented by formula (41) is converted into a compound represented by general formula (42):

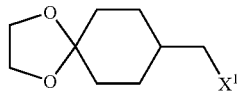

(42)

(wherein X$^1$ represents a chlorine atom, a bromine atom, an iodine atom, a benzenesulfonyloxy group, a p-toluenesulfonyloxy group, a methanesulfonyloxy group, or a trifluoromethanesulfonyloxy group), and reacted with a phenolate prepared from 2,3-difluorophenol, to thereby obtain a compound represented by formula (43):

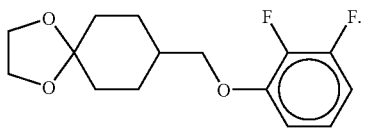

(43)

The obtained compound represented by formula (44) is deprotected under an acidic condition, to thereby obtain a compound represented by general formula (44):

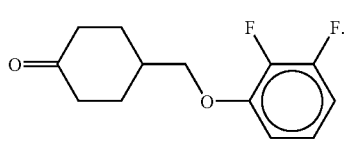

(44)

The obtained compound represented by formula (44) is reacted with an ylide prepared from methoxymethyl triphenylphosphonium chloride, to obtain a compound represented by formula (45):

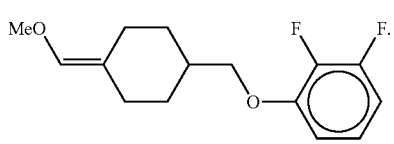

(45)

The obtained compound represented by formula (45) is hydrolyzed under an acidic condition, and further subjected to cis-trans isomerization under a basic condition, to thereby obtain a compound represented by formula (46);

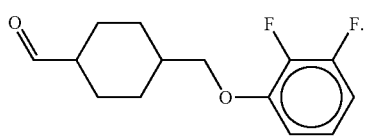

(46)

The obtained compound represented by formula (46) is subjected to the conversion reaction of formula (44) into formula (46) (wherein cis-trans isomerization is not performed) 2 times, to thereby to obtain a compound represented by formula (47):

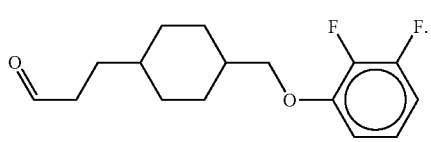

(47)

The obtained compound represented by formula (47) is reacted with an ylide prepared from methyl triphenylphosphonium bromide, to obtain a compound represented by formula (48):

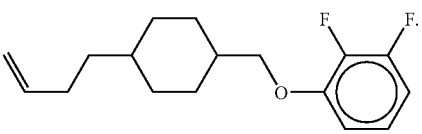

(48)

The obtained compound represented by formula (48) is oxidized, to obtain a compound represented by formula (49):

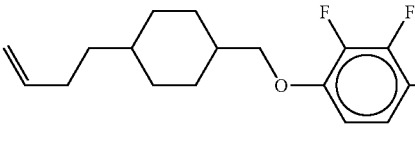

(49)

A phenolate prepared from the obtained compound represented by formula (49) is reacted with a compound represented by general formula (50):

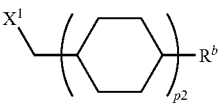

(50)

(wherein $X^1$ represents the same meaning as in general formula (42)), and thereby a compound represented by general formula (51) can be obtained:

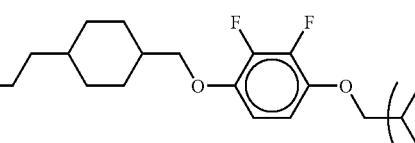

(51)

(wherein p2 and $R^b$ each represent the same meanings as in general formula (I-1)).

(Process 5)

A compound represented by formula (46) is reacted with an ylide prepared from ethyl triphenylphosphonium bromide and subjected to E/Z isomerization under an acidic condition, to thereby obtain a compound represented by formula (52):

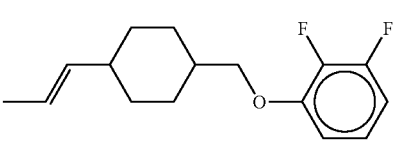

(52)

The obtained compound represented by formula (52) is subjected to the conversion reaction of formula (48) into general formula (51), and thereby a compound represented by general formula (53) can be obtained:

(53)

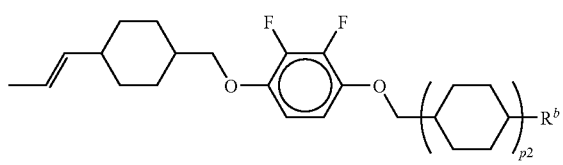

(wherein p2 and $R^b$ each represent the same meanings as in general formula (I-1)).

EXAMPLES

Hereunder is a further detailed description of the present invention with reference to examples. However the present invention is not to be limited by these examples. The structures of compounds were identified by nuclear magnetic resonance spectrum (NMR), mass spectrum (MS), and so on. Moreover, the term "%" in compositions of the following examples and comparative examples refers to "% by mass".

The following abbreviations are used in the description of compounds.
THF: tetrahydrofuran
DMF: N,N-dimethylformamide
Me: methyl group
Et: ethyl group
Bu: butyl group
Pen: pentyl group
Pr: propyl group
Ph: phenyl group
Ms: methanesulfonyl group In the examples, the following properties were measured.
$T_{NI}$: nematic-isotropic phase transition temperature (0° C.)
Δn: birefringence at 25° C.
Δ∈: dielectric anisotropy at 25° C.
η: viscosity (mPa·s) (20° C.)

Example 1

Synthesis of 2,3-difluoro-1-(trans-4-ethylcyclohexyl)methoxy-4-(trans-4-(trans-4-vinylcyclohexyl)cyclohexyl)methoxybenzene (1a)

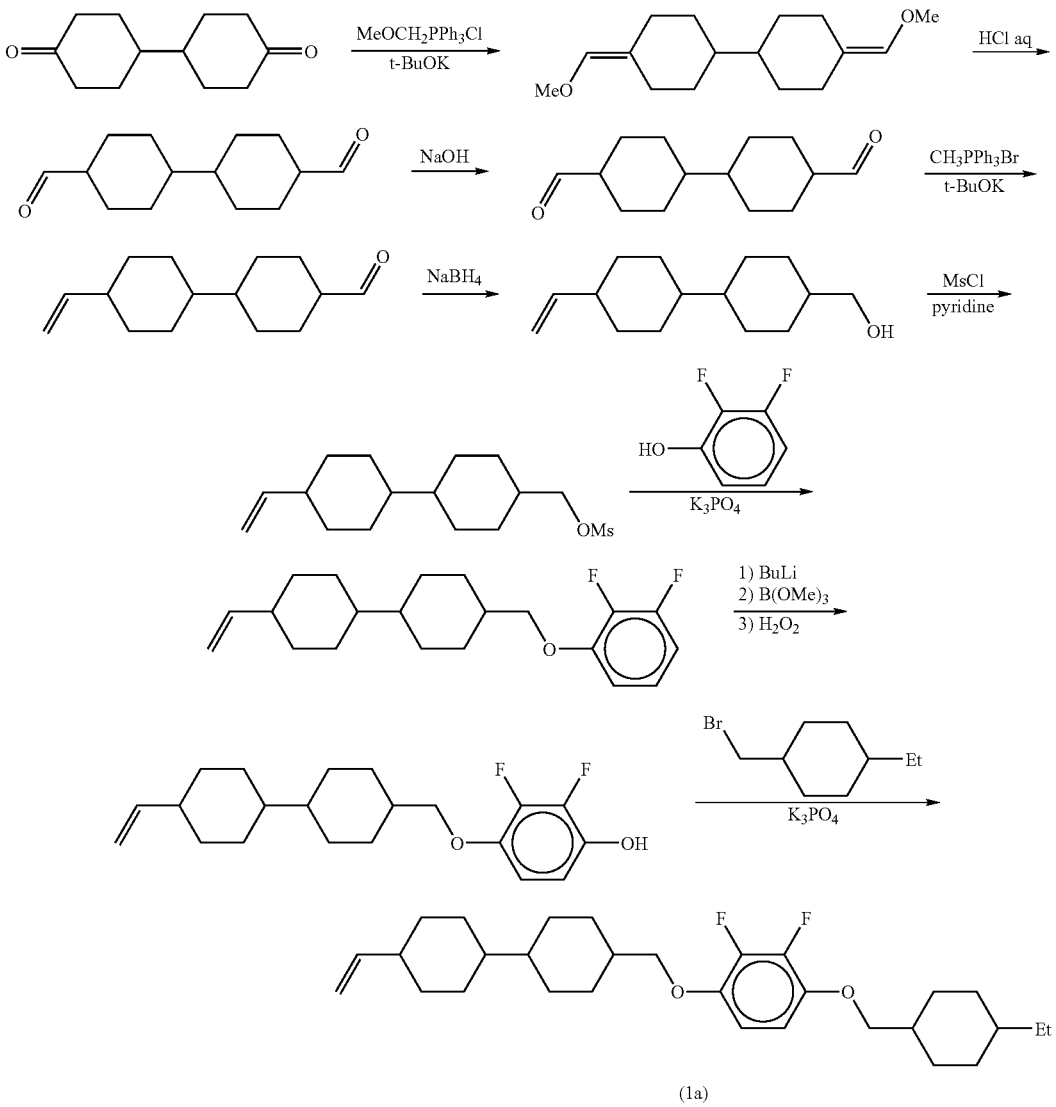

(1a)

(1-1) Synthesis of 4,4'-bismethoxymethylidene Bicyclohexyl 882.3 g of methoxymethyl triphenylphosphonium chloride was dispersed in 2600 mL of THF, and was cooled to −10° C. While keeping the internal temperature, 313.2 g of potassium-t-butoxide was added thereto. While keeping the internal temperature, the solution was stirred for 1 hour, and then THF (800 mL) solution containing 200.0 g of bicyclohexyl-4,4'-dione was added dropwise. While keeping the internal temperature, the solution was stirred for 1 hour, and then water was added to stop the reaction. The solvent was evaporated under reduced pressure. Then, the residue was added with hexane, was vigorously stirred, and was subjected to filtration (twice). The resultant product was mixed with the filtrate, then washed with 50% methanol aqueous solution and saturated saline in this order, and dried over anhydrous magnesium sulfate. The solvent was evaporated, to obtain 231.8 g of a white solid.

(1-2) Synthesis of trans,trans-bicyclohexyl-4,4'-dicarbaldehyde

To THF (930 mL) solution containing 231.8 g of the solid obtained in (1-1), 700 mL of 10% hydrochloric acid was added, and the solution was heated under reflux for 1 hour. The reaction solution was standing to cool. Then, the organic layer was separated, and extraction was performed from the aqueous layer with toluene (4 times). The organic layers were combined, washed with saturated saline, and then dried over anhydrous magnesium sulfate. The solvent was evaporated under reduced pressure, to obtain 204.5 g of reddish brown liquid. The resultant liquid was dissolved in 800 mL of methanol, and 80 mL of 10% sodium hydroxide aqueous solution was added dropwise thereto under vigorous stirring at −10° C., while keeping the internal temperature. The solution was stirred for 2 hours, while keeping the internal temperature. Water was added thereto, and the precipitated solid was filtered off by suction filtration. The obtained solid was washed with water and methanol in this order, and dried, to obtain 189.4 g of a white solid.

(1-3) Synthesis of 4'-vinylbicyclohexyl-4-carbaldehyde 192.5 g of methyl triphenylphosphonium bromide was dispersed in 580 mL of THF, and 66.6 g of potassium-t-butoxide was added thereto under vigorous stirring at −10° C. While keeping the internal temperature, the solution was stirred for 1 hour and then was added dropwise to THF (1800 mL) solution containing 120.0 g of the solid obtained in (1-2) at the internal temperature of 5 to 10° C. While keeping the internal temperature, the solution was stirred for 1 hour, and then water was added to stop the reaction. The reaction solution was washed with 5% ammonium chloride aqueous solution. The solvent of the organic layer was evaporated. The residue was added with hexane and toluene, and was washed with 50% methanol-water. The resultant product was dried over anhydrous magnesium sulfate. Then, the solvent was evaporated under reduced pressure, to obtain 60.1 g of a substantially colorless solid.

(1-4) Synthesis of trans-4-(trans-4-vinylcyclohexyl)cyclohexylmethanol

To an ethanol (120 mL) solution containing 1.65 g of sodium borohydride, THF (180 mL) solution containing 60.1 g of the substantially colorless solid obtained in (1-3) was added dropwise under stirring at −10° C., while keeping the internal temperature. The solution was heated to room temperature, and then was stirred for 2 hours. Water, ethyl acetate, and ammonium chloride aqueous solution were added thereto to stop the reaction. The reaction solution was added with saturated saline. Then, the organic layer was separated, and extraction was performed from the aqueous layer with ethyl acetate (twice). The organic layers were combined, washed with saturated saline, and dried over anhydrous magnesium sulfate. The solvent was evaporated under reduced pressure. The obtained residue was purified by column chromatography, to thereby obtain 15.4 g of trans-4-(trans-4-vinylcyclohexyl)cyclohexylmethanol in the form of a white solid.

(1-5) Synthesis of trans-4-(trans-4-vinylcyclohexyl)cyclohexylmethyl methanesulfonate 15.1 g of trans-4-(trans-4-vinylcyclohexyl)cyclohexylmethanol, 8.2 mL of pyridine, and 0.41 g of 4-dimethylaminopyridine were dissolved in 50 mL of dichloromethane. A dichloromethane (6 mL) solution containing 6.3 mL of methanesulfonyl chloride was added dropwise to the above solution on ice for 30 minutes. The solution was heated to room temperature, then stirred for 6 hours, and was left over night. The reaction solution was poured into 10% hydrochloric acid, and the organic layer was fractioned. The aqueous layer was extracted with dichloromethane. The organic layers were combined, washed with saturated saline, and then dried over anhydrous magnesium sulfate. The solvent was evaporated under reduced pressure. The residue was purified by column chromatography (silicagel/toluene) and recrystallization (hexane/toluene) 3 times, to thereby obtain 9.8 g of trans-4-(trans-4-vinylcyclohexyl)cyclohexylmethyl methanesulfonate in the form of colorless crystals.

(1-6) Synthesis of 2,3-difluoro-1-(trans-4-(trans-4-vinylcyclohexyl)cyclohexyl)methoxybenzene In DMF, trans-4-(trans-4-vinylcyclohexyl)cyclohexylmethyl methanesulfonate was dissolved, and 2,3-difluorophenol and tripotassium phosphate were added thereto, and then stirred for 2 hours at 80 to 100° C. Water and toluene were added thereto, and the organic layer was fractioned. The resultant product was washed with water and saturated saline, and then dried over anhydrous magnesium sulfate. The solvent was evaporated under reduced pressure. The residue was purified by column chromatography, to thereby obtain 2,3-difluoro-1-(trans-4-(trans-4-vinylcyclohexyl)cyclohexyl)methoxybenzene.

(1-7) Synthesis of 2,3-difluoro-4-(trans-4-(trans-4-vinylcyclohexyl)cyclohexyl)methoxyphenol 15.7 g of 2,3-difluoro-1-(trans-4-(trans-4-vinylcyclohexyl)cyclohexyl)methoxybenzene was dissolved in 80 mL of THF, and 51 mL of sec-butyllithium (1.01 M hexane, a cyclohexane solution) was added dropwise thereto at an internal temperature of −45° C. or lower. Then, further stirring was continued for 30 min. To this solution, 5.9 g of trimethyl borate was added dropwise at an internal temperature of −40° C. or lower, and further stirring was continued for 30 min, and then the temperature was increased to 0° C. Then, 16 mL of water was added dropwise, and then 16 mL of 15% hydrogen peroxide solution was further added dropwise for 30 min. The stirring was continued for 3 hours. Water and toluene were added thereto, and the organic layer was fractioned while the aqueous layer was extracted with toluene. The organic layers were combined, washed with saturated saline, and then dried over anhydrous magnesium sulfate. The solvent was evaporated under reduced pressure, and the residue was purified by column chromatography and recrystallization, to thereby obtain 2,3-difluoro-4-(trans-4-(trans-4-vinylcyclohexyl)cyclohexyl)methoxyphenol.

(1-8) Synthesis of 2,3-difluoro-1-(trans-4-ethylcyclohexyl)methoxy-4-(trans-4-(trans-4-vinylcyclohexyl)cyclohexyl)methoxybenzene (1a)

6.5 g of 2,3-difluoro-4-(trans-4-(trans-4-vinylcyclohexyl)cyclohexyl)methoxyphenol was dissolved in 35 mL of DME, and 4.9 g of (trans-4-ethylcyclohexyl)methyl bromide and 6.4 g of tripotassium phosphate were added thereto, and then stirred for 2 hours at 80 to 100° C. Water and toluene were added thereto, and the organic layer was fractioned. The resultant product was washed with saturated saline, and then dried over anhydrous magnesium sulfate. The solvent was evaporated under reduced pressure. The residue was purified by recrystallization and column chromatography, to thereby obtain 3.8 g of 2,3-difluoro-1-(trans-4-ethylcyclohexyl)methoxy-4-(trans-4-(trans-4-vinylcyclohexyl)cyclohexyl)methoxybenzene (1a) in the form of colorless crystals.

Phase transition temperature: C 94.1 N 197.5 I (C, N, and I respectively represent a crystal phase, a nematic phase, and an isotropic phase, which are the same hereinunder.)

$^1$H NMR (400 MHz, CDCl$_3$)

δ: 0.88 (t, J=7.2 Hz, 3H), 0.90-1.30 (m, 17H), 1.65-2.00 (m, 15H), 3.70-3.80 (m, 4H), 4.80-5.00 (m, 2H), 5.77 (ddd, J=16.8 Hz, J=10.4 Hz, J=6.4 Hz, 1H), 6.59 (d, J=5.6 Hz, 2H)

Example 2

Synthesis of 2,3-difluoro-1-(trans-4-ethylcyclohexyl)methoxy-4-(trans-4-vinylcyclohexyl)methoxybenzene (1b)

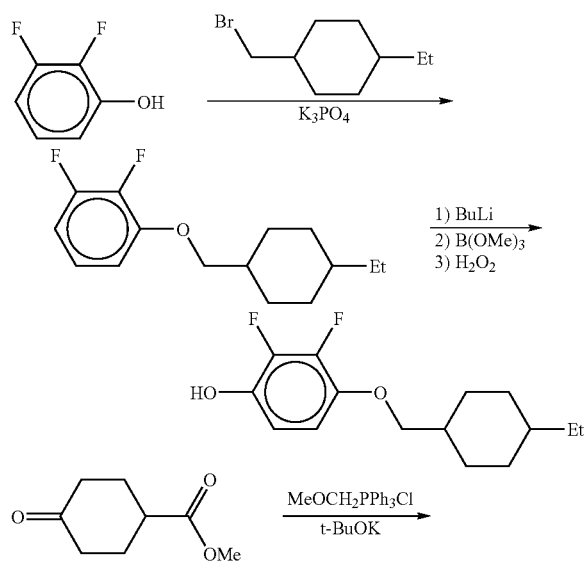
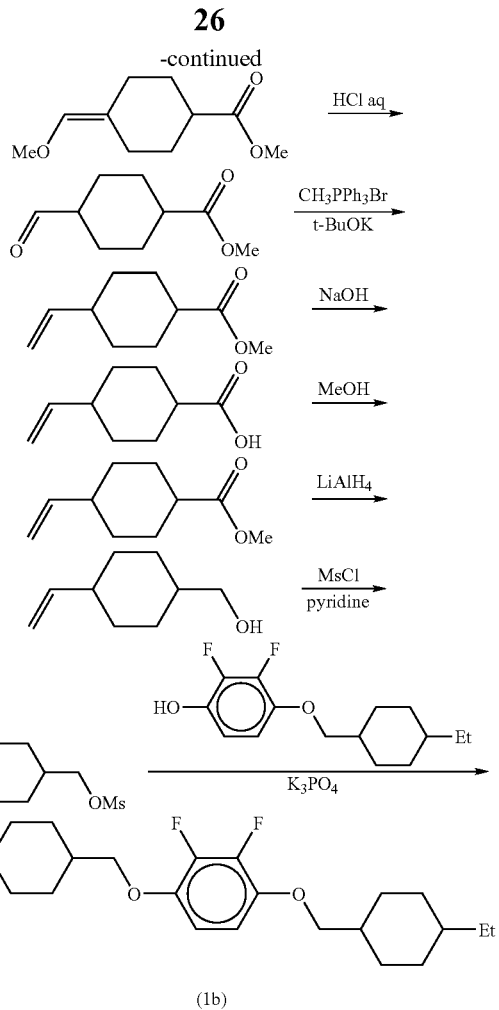

(1b)

(2-1) Synthesis of 2,3-difluoro-1-(trans-4-ethylcyclohexyl)methoxybenzene 30 g of 2,3-difluorophenol was dissolved in 300 ml of DMF, and 56.8 g of (trans-4-ethylcyclohexyl)methyl bromide and 73.4 g of tripotassium phosphate were added thereto, and then stirred for 1 hours at 100 to 110° C. Water and toluene were added thereto, and the organic layer was fractioned while the aqueous layer was extracted with toluene. The organic layers were combined, washed with saturated saline, and then subjected to column chromatography. Then, the solvent was evaporated under reduced pressure. The residue was purified by recrystallization, to thereby obtain 37 g of 2,3-difluoro-1-(trans-4-ethylcyclohexyl)methoxybenzene.

(2-2) Synthesis of 2,3-difluoro-4-(trans-4-ethylcyclohexyl)methoxyphenol 37 g of 2,3-difluoro-1-(trans-4-ethylcyclohexyl)methoxybenzene was dissolved in 222 mL of THF, and 59.9 mL of butyllithium (2.67 M hexane solution) was added dropwise thereto at an internal temperature of −40° C. or lower. Then, further stirring was continued for 30 min. To this solution, 18.1 g of trimethyl borate was added dropwise at an internal temperature of −40° C. or lower, and then the temperature was increased to 0° C. Then, 24.7 mL of 30% hydrogen peroxide solution was added dropwise for 5 min, and the stirring was continued for 3 hours. Water and toluene were added thereto, and the organic layer was fractioned while the aqueous layer was extracted with toluene. The organic layers were combined and washed with water, and then the solvent was evaporated under reduced pressure. The obtained residue was purified by column chromatography, to thereby obtain 20 g of 2,3-difluoro-4-(trans-4-ethylcyclohexyl)methoxyphenol.

(2-3) Synthesis of methyl 4-methoxymethylidene-cyclohexane Carboxylate 263.4 g of methoxymethyl triphenylphosphonium chloride was dispersed in 750 mL of tetrahydrofuran, and 86.2 g of potassium-t-butoxide was added thereto at −9 to −4° C. for 5 minutes. The solution was further stirred at −4 to −11° C. for 30 minutes. Then, 100.0 g of methyl 4-oxocyclohexane carboxylate was dissolved in 300 mL of THF, which was added dropwise to the above solution at −10 to 4° C. for 80 minutes. The solution was further stirred at 0 to 4° C. for 60 minutes, and then 7.0 g of ammonium chloride and 20 mL of water were added thereto. The solvent of the reaction mixture was evaporated under reduced pressure. Then, 600 mL of hexane was added and the solution was stirred under room temperature for 30 minutes. After filtrating the precipitate, the precipitate was again suspended and washed with 600 mL of hexane, combined with the hexane filtrate, and washed with a mixed solution of methanol-water (1:1), water, and saturated saline in this order. The resultant product was dried over anhydrous sodium sulfate. Then, the solvent was evaporated under reduced pressure, to obtain 103 g of methyl 4-methoxymethylidene-cyclohexane carboxylate in the form of an oil-like product.

(2-4) Synthesis of methyl 4-formylcyclohexane Carboxylate 103 g of methyl 4-methoxymethylidene-cyclohexane carboxylate was dissolved in 350 mL of THF, and 100 mL of 10% hydrochloric acid was added dropwise thereto at 11 to 13° C. for 10 minutes. The solution was further stirred at room temperature for 3 hours, and then 80 mL of hexane was added. The aqueous layer was extracted with ethyl acetate, and then the organic layers were combined and washed with water and saturated saline in this order. The resultant product was dried over anhydrous magnesium sulfate, and then concentrated, to obtain 92.4 g of methyl 4-formylcyclohexane carboxylate in the form of an oil-like product. The obtained product was analyzed by gas chromatography, and was found to be a mixture of cis-form:trans-form at a ratio of 64:36.

(2-5) Synthesis of methyl 4-vinylcyclohexane Carboxylate 297.4 g of methyl triphenylphosphonium bromide was dispersed in 900 mL of THF, and 95.6 g of potassium-t-butoxide was added thereto at −8° C. for 3 minutes. The solution was further stirred for 30 minutes, and then 92.4 g of methyl 4-formyleyclohexane carboxylate was dissolved in 270 mL of THF, which was added dropwise to the above solution at −6 to 4° C. for 50 minutes. The solution was further stirred at 0 to 4° C. for 30 minutes, and then 15 mL of water was added thereto. The solvent of the reaction mixture was evaporated under reduced pressure. Then, 500 mL of hexane was added and the solution was stirred under room temperature for 30 minutes. After filtrating the precipitate, the precipitate was again suspended and washed with 500 mL of hexane, combined with the hexane filtrate, and washed with a mixed solution of methanol-water (1:1), water, and saturated saline in this order. The resultant product was dried over anhydrous sodium sulfate. Then, the solvent was evaporated under reduced pressure, to obtain 81.2 g of an oil-like product. 57.3 g of methyl 4-vinylcyclohexane carboxylate was obtained by distillation under reduced pressure Boiling point: 122 to 127° C./48 hPa. The obtained product was analyzed by gas chromatography, and was found to be a mixture of cis-form: trans-form at a ratio of 26:74.

(2-6) Synthesis of trans-4-vinylcyclohexane Carboxylic acid 55.3 g of methyl 4-vinylcyclohexane carboxylate was dissolved in 60 mL of methanol, and was cooled to 15° C. Then, 100 g of 20% sodium hydroxide aqueous solution was added thereto. The solution was further stirred at room temperature for 2 hours, and then concentrated hydrochloric acid was added to make the system acidic. Extraction was performed with hexane, and then the organic layer was washed with saturated saline. The resultant product was dried over anhydrous sodium sulfate, and concentrated, to obtain 52.4 g of reaction mixture. 23.0 g of trans-4-vinylcyclohexane carboxylic acid was obtained by recrystallization from hexane.

(2-7) Synthesis of Methyl trans-4-vinylcyclohexane Carboxylate 23.0 g of trans-4-vinylcyclohexane carboxylic acid was dissolved in 120 mL of methanol, and added with 0.1 g of trimethylsilylchloride, which was then subjected to reflux for 6 hours. Then, the resultant product was cooled to room temperature and concentrated under reduced pressure. 150 mL of hexane was added thereto, and the methanol phase was separated. Then, the methanol phase was extracted with hexane, and the organic layers were combined and washed with saturated saline. The resultant product was dried over anhydrous sodium sulfate, and then concentrated, to obtain 29.5 g of methyl trans-4-vinylcyclohexane carboxylate in the form of an oil-like product.

(2-8) Synthesis of (trans-4-vinylcyclohexyl)methanol 5.7 g of lithium aluminium hydride was dispersed in 50 mL of THF. 29.5 g of methyl trans-4-vinyleyclohexane carboxylate was dissolved in 75 mL of THF, which was added dropwise to the above solution at 15 to 16° C. for 40 minutes. The solution was further stirred at 10 to 20° C. for 30 minutes, and then water was slowly added thereto. About 70 mL of 10% hydrochloric acid was added. While washing and rinsing with hexane, a sludge-like insoluble matter was removed by a decanter. Then, the obtained organic layer was washed with 10% hydrochloric acid, saturated sodium hydrogencarbonate aqueous solution, and saturated saline, in this order. The resultant product was dried over anhydrous sodium sulfate, and concentrated, to obtain 26 g of (trans-4-vinylcyclohexyl)methanol.

(2-9) Synthesis of (trans-4-vinylcyclohexyl)methyl methanesulfonate 26 g of (trans-4-vinylcyclohexyl)methanol was dissolved in 100 mL of dichloromethane, and 23.6 g of pyridine and 0.9 g of 4-dimethylaminopyridine were added thereto. 18.8 g of methanesulfonyl chloride was dissolved in 36 mL of dichloromethane, which was added dropwise to the above solution at 14 to 20° C. for 25 minutes. The solution was further stirred at room temperature for 7 hours, and was then left over night.

40 mL of water was added thereto, and the organic layer was separated. Then, the organic layer was washed with 10% hydrochloric acid, water, saturated sodium bicarbonate water, and saturated aqueous solution of ammonium chloride, in this order. The resultant product was dried over anhydrous magnesium sulfate, and concentrated, to obtain 32.7 g of a solid product. 30.8 g of (trans-4-vinylcyclohexyl)methyl methanesulfonate was obtained by recrystallization from hexane.

(2-10) Synthesis of 2,3-difluoro-1-(trans-4-ethylcyclohexyl)methoxy-4-(trans-4-vinylcyclohexyl)methoxybenzene (1b)

In the dichloromethane (50 mL) solution containing 10 g of 2,3-difluoro-4-(trans-4-ethylcyclohexyl)methoxyphenol, 12 g of tripotassium phosphate and 8.1 g of (trans-4-vinylcyclohexyl)methyl methanesulfonate were dissolved, and the solution was stirred at 80 to 100° C. for 2 hours. Water and toluene were added to the solution, and the organic layer was fractioned, washed with water and saturated saline, and then dried over silicagel. The solvent was evaporated under reduced pressure. The residue was purified by recrystallization and column chromatography, to thereby obtain 7.9 g of 2,3-difluoro-1-(trans-4-ethylcyclohexyl)methoxy-4-(trans-4-vinylcyclohexyl)methoxybenzene (1b) in the form of colorless crystals.

Phase transition temperature: C 59.2 N 77.1 I

MS m/z: 392 (M$^+$), 146 (100)

$^1$H-NMR (400 MHz, CDCl$_3$)

δ: 0.88 (t, J=7.6 Hz, 3H), 0.90-1.30 (m, 1H), 1.65-2.00 (m, 11H), 3.70-3.80 (m, 4H), 4.85-5.05 (m, 2H), 5.79 (ddd, J=17.2 Hz J=10.4 Hz, J=6.8 Hz, 1H), 6.60 (d, J=5.6 Hz, 2H)

Example 3

Synthesis of 2,3-difluoro-1-(trans-4-ethylcyclohexyl)methoxy-4-((trans-4-(3-butenyl)cyclohexyl)methoxy)benzene (1c)

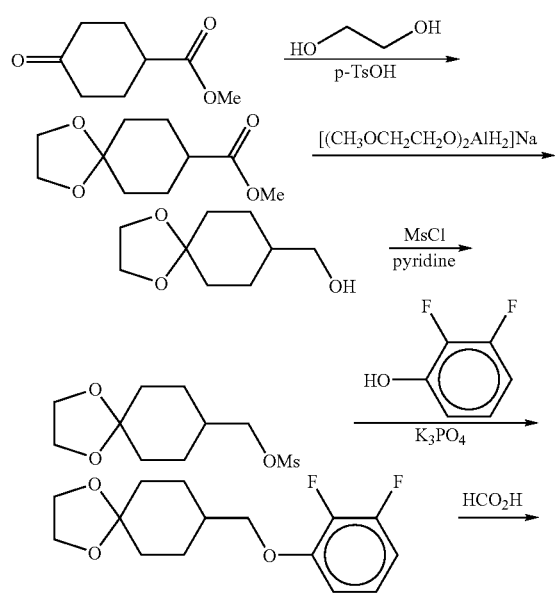

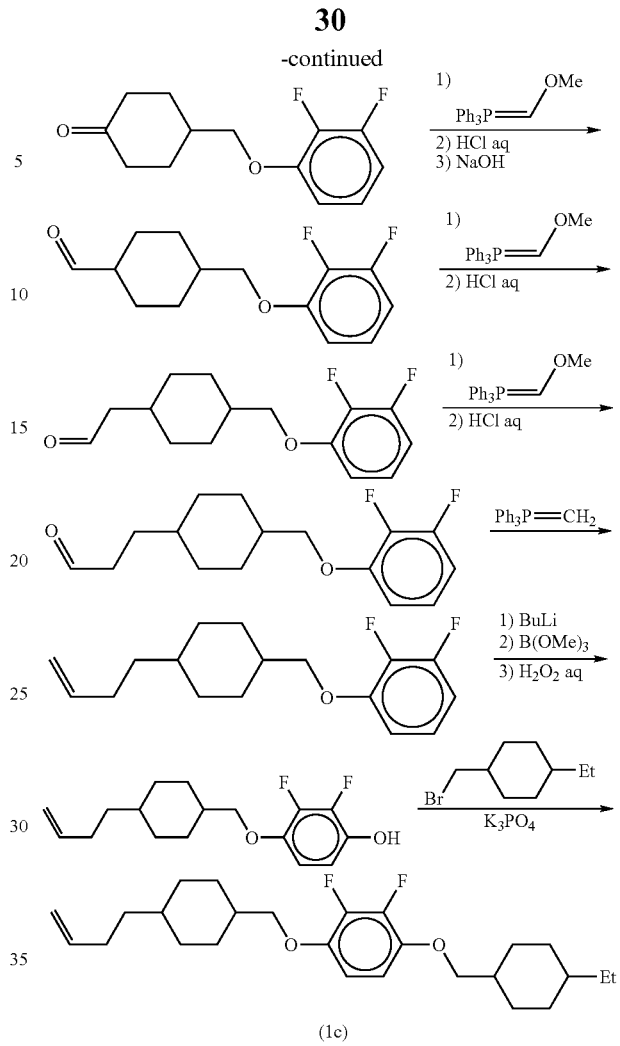

(3-1) Synthesis of methyl 4-(4',4'-ethylenedioxy)cyclohexane Carboxylate 300 mL of methyl 4-oxocyclohexane carboxylate was dissolved in 900 mL of toluene, and 257 mL of ethylene glycol and 5 g of p-toluenesulfonic acid hydrates were added thereto. The solution was heated and stirred for 4 hours while removing the produced water. After cooling to room temperature, 100 mL of saturated sodium hydrogencarbonate aqueous solution was added dropwise to the solution, 500 mL of water was added, and then the organic layer was fractioned. The aqueous layer was extracted with toluene, and the organic layers were combined, washed with water and saturated saline, and dried over anhydrous magnesium sulfate. The solvent was evaporated under reduced pressure so that the total amount of the resultant product became 1.2 L, to thereby obtain the toluene solution containing methyl 4-(4',4'-ethylenedioxy)cyclohexane carboxylate.

(3-2) Synthesis of (4-(4',4'-ethylenedioxy)cyclohexyl)methanol

To the toluene solution obtained in (3-1), 832 g of 70% sodium bis(2-methoxyethoxy) aluminium hydride toluene solution was added dropwise, and stirred for 2 hours. To the reaction solution, 100 mL of ethyl acetate was added dropwise, 500 mL of water was added, and the organic layer was fractioned. The aqueous layer was extracted with toluene, and the organic layers were combined, washed with water and saturated saline, and dried over anhydrous magnesium sulfate. The solvent was evaporated under reduced pressure, and the residue was distilled under reduced pressure (179 to 184° C./2.5 kPa), to thereby obtain 153.9 g of (4-(4',4'-ethylenedioxy)cyclohexyl)methanol in the form of a colorless and oil-like product.

(3-3) Synthesis of (4-(4',4'-ethylenedioxy)cyclohexyl)methyl methanesulfonate 153.9 g of (4-(4',4'-ethylenedioxy)cyclohexyl)methanol was dissolved in 500 mL of dichloromethane, and 108 mL of pyridine and 11 g of 4-dimethylaminopyridine were added thereto. This solution was cooled with ice. 83 mL of methanesulfonyl chloride was added dropwise to the above solution for 30 minutes. After heating to room temperature, the solution was stirred for 2 hours. The reaction solution was poured into 400 mL of water, and the organic layer was fractioned while the aqueous layer was extracted with dichloromethane. The organic layers were combined, washed with water, saturated sodium hydrogencarbonate aqueous solution, and saturated saline, and then dried over anhydrous sodium sulfate. The solvent was evaporated under reduced pressure, and the residue was purified by column chromatography, to thereby obtain 230.6 g of (4-(4',4'-ethylenedioxy)cyclohexyl)methyl methanesulfonate in the form of a palish yellow and oil-like product.

(3-4) Synthesis of 1-((4-(4',4'-ethylenedioxy)cyclohexyl)methoxy)-2,3-difluorobenzene 15.9 g of (4-(4',4'-ethylenedioxy)cyclohexyl)methyl methanesulfonate was dissolved in 150 mL of DMF, and 20.2 g of tripotassium phosphate and 9.1 g of 2,3-difluorophenol were added thereto, and then stirred for 2 hours at 80 to 100° C. The reaction solution was poured into water, and extracted with toluene. The organic layer was washed with water and saturated saline, and then dried over silicagel. The solvent was evaporated under reduced pressure so that the total amount of the resultant product became 100 mL, to thereby obtain the toluene solution containing 1-((4-(4',4'-ethylenedioxy)cyclohexyl)methoxy)-2,3-difluorobenzene.

(3-5) Synthesis of 1-((4-oxocyclohexyl)methoxy)-2,3-difluorobenzene

To the toluene solution obtained in (3-4), 80 mL of formic acid was added, and the solution was stirred for 6 hours at room temperature. Water and toluene were added thereto, and the organic layer was fractioned, washed with water and saturated saline, and then dried over anhydrous sodium sulfate. The solvent was evaporated under reduced pressure, to thereby obtain 13.8 g of 1-((4-oxocyclohexyl)methoxy)-2,3-difluorobenzene.

(3-6) Synthesis of 1-((trans-4-formylcyclohexyl)methoxy)-2,3-difluorobenzene 13.8 g of 1-((4-oxocyclohexyl)methoxy)-2,3-difluorobenzene was dissolved in 50 mL of THF, and 23.6 g of methoxymethyl triphenylphosphonium chloride was added thereto. To this solution, the THF (20 mL) solution containing 7.7 g of potassium-t-butoxide was added dropwise at an internal temperature of 10 to 25° C., and the solution was stirred for 30 nm. 10 mL of water was added thereto, and the solvent was evaporated under reduced pressure. Hexane and 50% methanol aqueous solution were added thereto, and the organic layer was fractioned. This organic layer was washed with 50% methanol aqueous solution and saturated saline, and subjected to column chromatography. After evaporating the solvent under reduced pressure, the residue was dissolved in 100 mL of THF, and 100 mL of 10% hydrochloric acid was added thereto, followed by reflux with heating for 3 hours. To the solution, water and ethyl acetate were added, and the organic layer was fractioned, washed with saturated saline, saturated sodium hydrogencarbonate, and saturated saline in this order, and dried over anhydrous sodium sulfate. Then, the solvent was evaporated under reduced pressure. To the residue, 30 mL of methanol and 20% sodium hydroxide aqueous solution were added, and the solution was stirred with ice-cooling for 2 hours. To the solution, water and ethyl acetate were added, and the organic layer was fractioned, washed with saturated saline 3 times, and dried over anhydrous sodium sulfate. The solvent was evaporated under reduced pressure, to thereby obtain 11.5 g of 1-((trans-4-formylcyclohexyl)methoxy)-2,3-difluorobenzene.

(3-7) Synthesis of 1-((trans-4-(formylmethyl)cyclohexyl)methoxy)-2,3-difluorobenzene 11.5 g of 1-((trans-4-formylcyclohexyl)methoxy)-2,3-difluorobenzene was dissolved in 50 mL of THF, and 18.6 g of methoxymethyl triphenylphosphonium chloride was added thereto. To this solution, the THF (20 mL) solution containing 6.1 g of potassium-t-butoxide was added dropwise at an internal temperature of 5 to 20° C., and the solution was stirred for 30 min. 10 mL of water was added thereto, and the solvent was evaporated under reduced pressure. Hexane and 50% methanol aqueous solution were added thereto, and the organic layer was fractioned. This organic layer was washed with 50% methanol aqueous solution and saturated saline, and subjected to column chromatography. After evaporating the solvent under reduced pressure, the residue was dissolved in 70 mL of THF, and 70 mL of 10% hydrochloric acid was added thereto, followed by reflux with heating for 2 hours. To the solution, water and ethyl acetate were added, and the organic layer was fractioned, washed with saturated saline 3 times, and dried over anhydrous sodium sulfate. The solvent was evaporated under reduced pressure, to thereby obtain 8.2 g of 1-((trans-4-(formylmethyl)cyclohexyl)methoxy)-2,3-difluorobenzene.

(3-8) Synthesis of 1-((trans-4-(2-formylethyl)cyclohexyl)methoxy)-2,3-difluorobenzene 8.2 g of 1-((trans-4-(formylmethyl)cyclohexyl)methoxy)-2,3-difluorobenzene was dissolved in 50 mL of THF, and 12.6 g of methoxymethyl triphenylphosphonium chloride was added thereto. To this solution, the THF (20 mL) solution containing 4.1 g of potassium-t-butoxide was added dropwise at an internal temperature of 5 to 20° C., and the solution was stirred for 30 min. 10 mL of water was added thereto, and the solvent was evaporated under reduced pressure. Hexane and 50% methanol aqueous solution were added thereto, and the organic layer was fractioned. This organic layer was washed with 50% methanol aqueous solution and saturated saline, and dried over silicagel. After evaporating the solvent under reduced pressure, the residue was dissolved in 50 mL of THF, and 50 mL of 10% hydrochloric acid was added thereto, followed by reflux with heating for 2 hours. To the solution, water and ethyl acetate were added, and the organic layer was fractioned, washed with saturated saline 3 times, and dried over anhydrous sodium sulfate. The solvent was evaporated under reduced pressure, to thereby obtain 7.0 g of 1-((trans-4-(2-formylethyl)cyclohexyl)methoxy)-2,3-difluorobenzene.

(3-9) Synthesis of 1-((trans-4-(3-butenyl)cyclohexyl)methoxy)-2,3-difluorobenzene 7.0 g of 1-((trans-4-(2-formylethyl)cyclohexyl)methoxy)-2,3-difluorobenzene was dissolved in 30 mL of THF, and 10.6 g of methyl triphenylphosphonium bromide was added thereto. To this solution, the THF (15 mL) solution containing 3.3 g of potassium-t-butoxide was added dropwise at an internal temperature of 5 to 20° C., and the solution was stirred for 30 min. 10 mL of water was added thereto, and the solvent was evaporated under reduced pressure. Hexane and 50% methanol aqueous solution were added thereto, and the organic layer was fractioned. This organic layer was washed with 50% methanol aqueous solution and saturated saline, and subjected to column chromatography. The solvent was evaporated under reduced pressure, to thereby obtain 3.0 g of 1-((trans-4-(3-butenyl)cyclohexyl)methoxy)-2,3-difluorobenzene.

(3-10) Synthesis of 4-((trans-4-(3-butenyl)cyclohexyl)methoxy)-2,3-difluorophenol 3 g of 1-((trans-4-(3-butenyl)cyclohexyl)methoxy)-2,3-difluorobenzene was dissolved in 30 mL of THF, and 11.7 mL of sec-butyllithium (1.01 M cyclohexane, a hexane solution) was added dropwise thereto at an internal temperature of −40 to −60° C. Then, the solution was stirred for 30 min. To this solution, 1.3 g of trimethyl borate was added, and the solution was heated to room temperature. Then, 1.8 mL of 30% hydrogen peroxide solution was added thereto, and the solution was stirred at 40° C. for 1 hours. To the solution, 5% hydrochloric acid was added, and the solution was stirred for 1 hour. Toluene was added thereto, and the organic layer was fractioned, washed with saturated saline, and then dried over anhydrous magnesium sulfate, to thereby obtain 4-((trans-4-(3-butenyl)cyclohexyl)methoxy)-2,3-difluorophenol.

(3-11) Synthesis of 2,3-difluoro-1-(trans-4-ethylcyclohexyl)methoxy-4-((trans-4-(3-butenyl)cyclohexyl)methoxy)benzene (1c)

The total amount of 4-((trans-4-(3-butenyl)cyclohexyl)methoxy)-2,3-difluorophenol obtained in (3-10) was dissolved in 20 mL of DMF, 3.4 g of tripotassium phosphate and 2.6 g of (trans-4-ethylcyclohexyl)methyl bromide were dissolved thereto, and the solution was stirred at 80 to 100° C. for 2 hours. Water and toluene were added to the solution, and the organic layer was fractioned, washed with water and saturated saline, and then dried over anhydrous magnesium sulfate. The solvent was evaporated under reduced pressure. The residue was purified by recrystallization and column chromatography, to thereby obtain 1.3 g of 2,3-difluoro-1-(trans-4-ethylcyclohexyl)methoxy-4-((trans-4-(3-butenyl)cyclohexyl)methoxy)benzene (1c) in the form of colorless crystals.
Phase transition temperature: C 60.6 N 88.5 I
MS m/z: 420 (M+), 146 (100)
$^{1}$H-NMR (400 MHz, CDCl$_3$)
δ: 0.88 (t, J=7.2 Hz, 3H), 0.85-1.40 (m, 14H), 1.70-2.20 (m, 12H), 3.76 (d, J=6.4 Hz, 4H), 4.90-5.04 (m, 2H), 5.75-5.87 (m, 1H), 6.55-6.65 (m, 2H)

Example 4

Preparation of Liquid Crystal Composition (1)

A host liquid crystal composition (H) including the following composition was prepared.

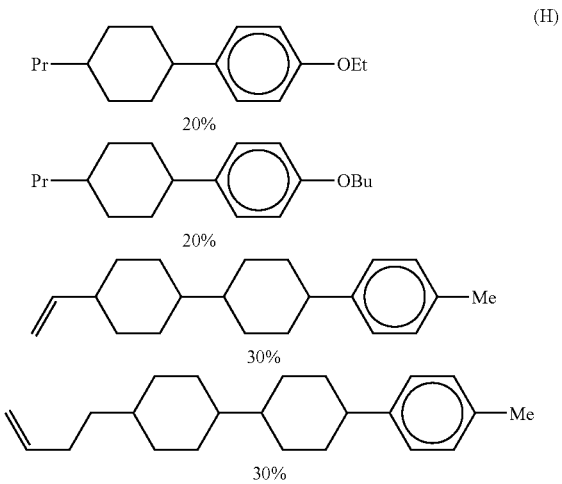

Here, the physical properties of (H) are as follows.
Nematic phase upper limit temperature (TN-I): 103.2° C.
Dielectric anisotropy (Δ∈): 0.03
Refractive index anisotropy (Δn): 0.099
Viscosity (mPa·s): 15.2
A liquid crystal composition (M-1) including 80% of the host liquid crystal (H) and 20% of (1a) obtained in Example 1 was prepared. The physical properties of this composition are as follows.
Nematic phase upper limit temperature (TN-I): 121.0° C.
Dielectric anisotropy (Δ∈): −1.03
Refractive index anisotropy (Δn): 0.099
Viscosity (mPa·s): 23.4
The liquid crystal composition (M-1) including the compound (1a) of the present invention showed a much higher nematic phase upper limit temperature (TN-I), and a lower and negative dielectric anisotropy (Δ∈), compared to the host liquid crystal (H). From this result, it is understood that the compound (1a) of the present invention stably shows a nematic phase even at a high temperature, with a negative dielectric anisotropy of a very large absolute value.

Example 5

Preparation of Liquid Crystal Composition (2)

A liquid crystal composition (M-2) including 80% of the host liquid crystal (H) prepared in Example 4 and 20% of (1b) obtained in Example 2 was prepared. The physical properties of this composition are as follows.
Nematic phase upper limit temperature (TN-I): 97.3° C.
Dielectric anisotropy (Δ∈): −1.20
Refractive index anisotropy (Δn): 0.097
Viscosity (mPa·s): 20.6
The liquid crystal composition (M-2) including the compound (1b) of the present invention showed a much lower and negative dielectric anisotropy (Δ∈), compared to the host liquid crystal (H). From this result, it is understood that the compound (2a) of the present invention shows a negative dielectric anisotropy of a very large absolute value.

Example 6

Preparation of Liquid Crystal Composition (3)

A liquid crystal composition (M-3) including 80% of the host liquid crystal (H) prepared in Example 4 and 20% of (1c) obtained in Example 3 was prepared. The physical properties of this composition are as follows.

Nematic phase upper limit temperature (TN-I): 99.3° C.
Dielectric anisotropy (Δ∈): −1.09
Refractive index anisotropy (Δn): 0.096
Viscosity (mPa·s): 19.6

The liquid crystal composition (M-3) including the compound (1c) of the present invention showed a much lower and negative dielectric anisotropy (Δ∈), compared to the host liquid crystal (H). From this result, it is understood that the compound (1c) of the present invention shows a negative dielectric anisotropy of a very large absolute value.

Comparative Example 1

A liquid crystal composition (MR-1) including 80% of the host liquid crystal (H) prepared in Example 4 and 20% of the compound (R1) described in Patent Document 8 was prepared.

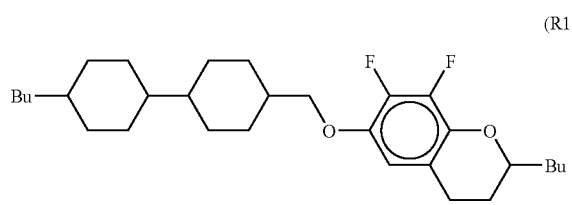

(R1)

The physical properties of this composition are as follows.
Nematic phase upper limit temperature (TN-I): 109.2° C.
Dielectric anisotropy (Δ∈): −1.19
Refractive index anisotropy (Δn): 0.095
Viscosity (mPa·s): 24.8

The physical properties of (M-2) of Example 5, (M-3) of Example 6, and (MR-1) of Comparative Example 1 are summarized in Table 1.

TABLE 1

Examples 5 and 6, and Comparative Example 1

|  | Composition | | |
|---|---|---|---|
|  | (M-2) (H) 80% (1b) 20% | (M-3) (H) 80% (1c) 20% | (MR-1) (H) 80% (R1) 20% |
| $T_{N-I}$ (° C.) | 97.3 | 99.3 | 109.2 |
| Δn | 0.097 | 0.096 | 0.095 |
| Δ∈ | −1.20 | −1.09 | −1.19 |
| η (mPa · s) | 20.6 | 19.6 | 24.8 |

The liquid crystal composition (MR-1) including the compound (R1) described in Patent Document 8 showed a higher viscosity, compared to the liquid crystal compositions using a compound of the present invention. From this result, it is understood that compounds of the present invention show a negative dielectric anisotropy of a very large absolute value and a low viscosity.

Example 7

Preparation of Liquid Crystal Composition (4)

A liquid crystal composition (M-4) represented by the following structures was prepared, and the physical properties thereof were measured.

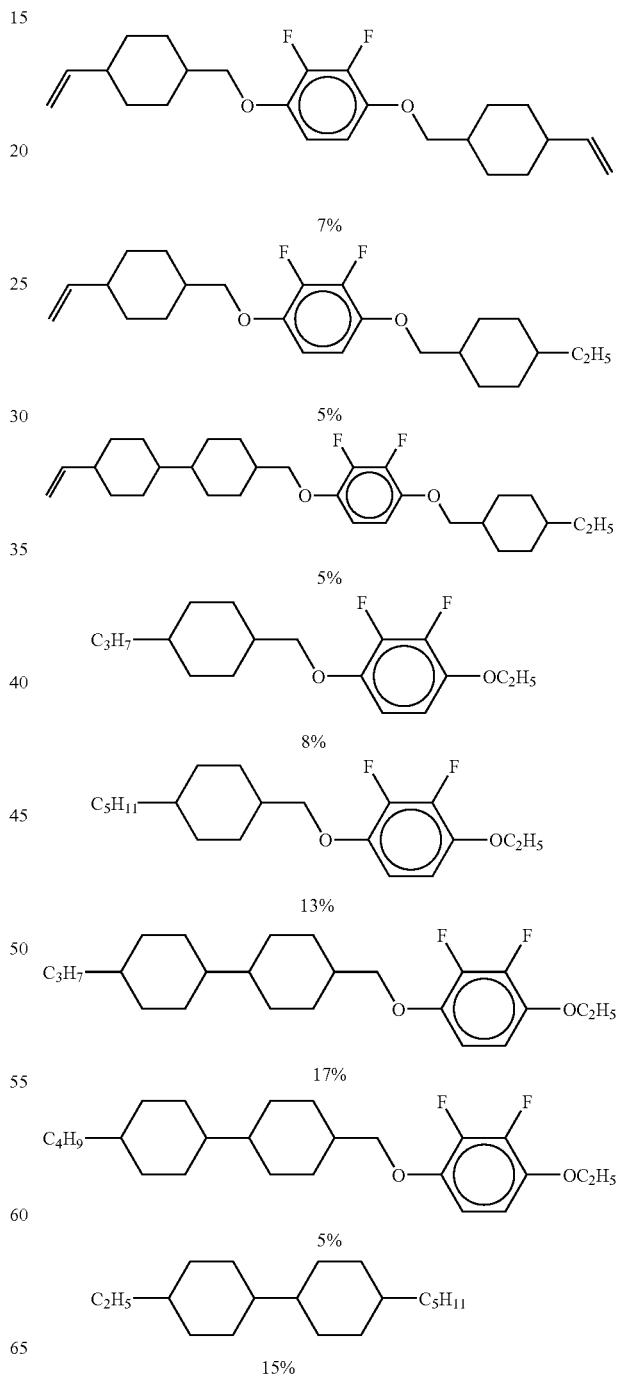

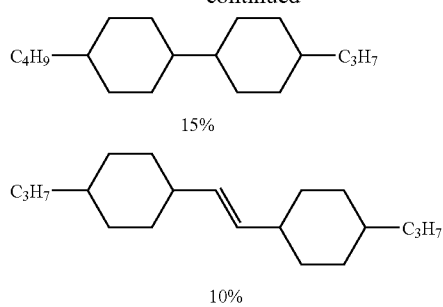
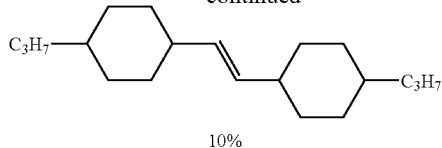

The physical properties of (M-4) were such that Tni: 81.2° C., Δn: 0.074, Δ∈: −4.7, and η: 22.2 mPa·s.

Comparative Example 2

As Comparative Example 2, a liquid crystal composition (MR-2) represented by the following structures, which did not contain a compound represented by general formula (I), was prepared, and the physical properties thereof were measured.

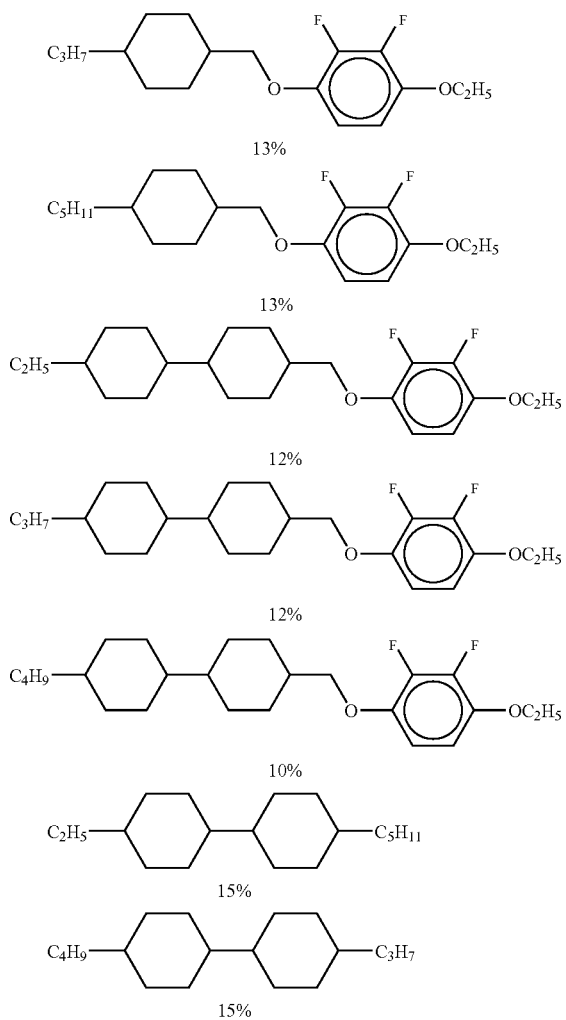

The physical properties of (MR-2) were such that Tni: 77.5° C., Δn: 0.073, Δ∈: −4.8, and η: 23.5 mPa·s. It is understood that (M-4) is an excellent liquid crystal composition having approximately equivalent values of Δn and negative Δ∈ of a large absolute value, but higher Tni and a lower viscosity, as compared to those of (MR-2).

Example 8

Preparation of Liquid Crystal Composition (5)

A liquid crystal composition (M-5) represented by the following structures was prepared, and the physical properties thereof were measured.

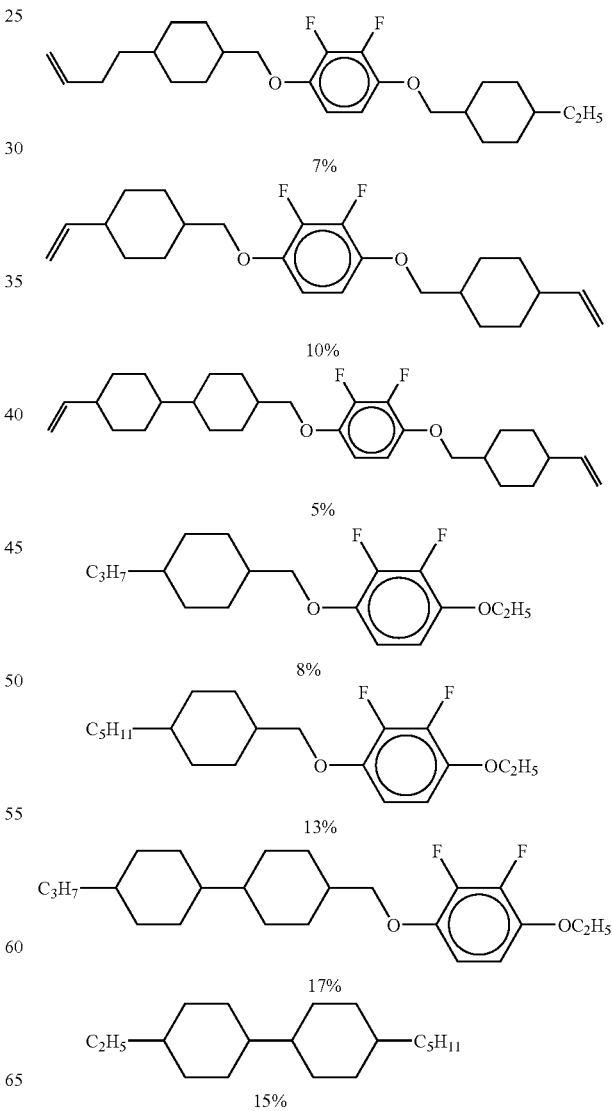

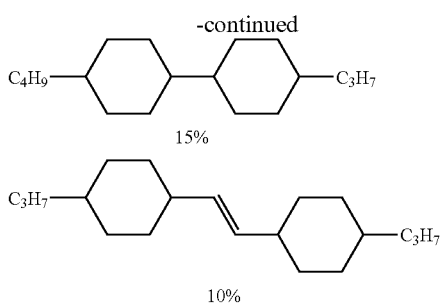

15%

10%

The physical properties of (M-5) were such that Tni: 79.5° C., Δn: 0.074, Δ∈: −4.7, and η: 22.4 mPa·s.

Example 9

Preparation of Liquid Crystal Composition (6)

A liquid crystal composition (M-6) represented by the following structures was prepared, and the physical properties thereof were measured.

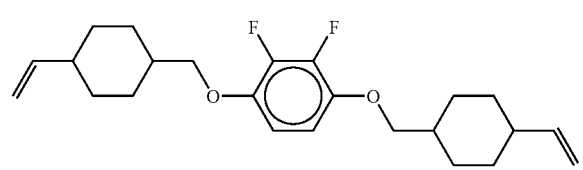

12%

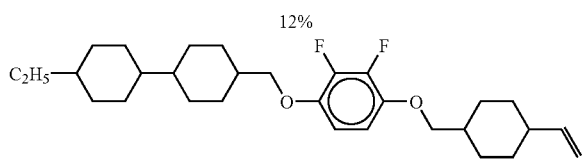

5%

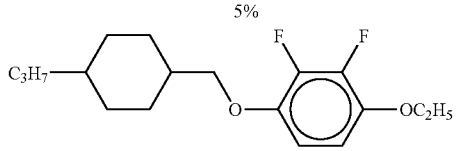

11%

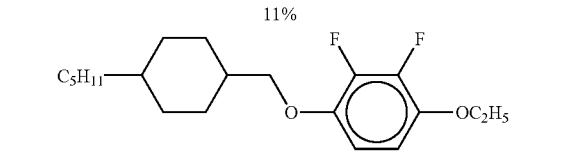

10%

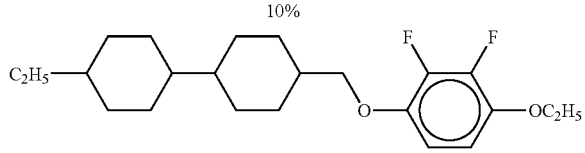

12%

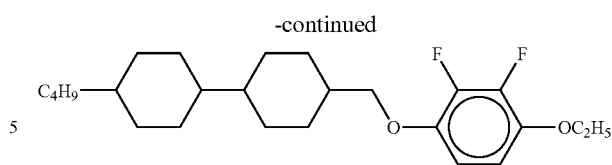

5%

20%

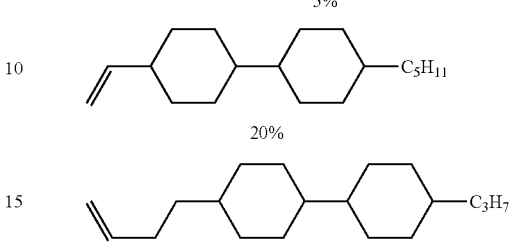

10%

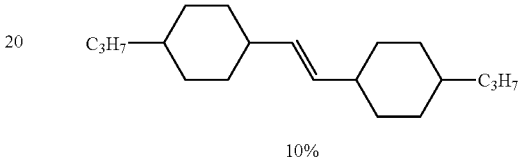

10%

The physical properties of (M-6) were such that Tni: 80.3° C., Δn: 0.074, Δ∈: −4.8, and η: 19.0 mPa·s.

These physical properties are summarized in Table 2.

TABLE 2

| Examples 7, 8, and 9, and Comparative Example 2 | | | | |
|---|---|---|---|---|
|  | (M-4) | (M-5) | (M-6) | (MR-2) |
| (I) (%) | 17 | 22 | 17 | — |
| (II) (%) | 43 | 38 | 43 | 40 |
| (III) (%) | 40 | 40 | 40 | 60 |
| $T_{N-I}$ (° C.) | 81.2 | 79.5 | 80.3 | 77.5 |
| Δn | 0.074 | 0.074 | 0.074 | 0.073 |
| Δε | −4.7 | −4.7 | −4.8 | −4.8 |
| η (mPa · s) | 22.2 | 22.4 | 19.0 | 23.5 |

It is revealed that MR-2 is poor in a nematic phase upper limit temperature and viscosity, compared to M-4, M-5, and M-6.

Example 10

Preparation of Liquid Crystal Composition (7)

A liquid crystal composition (M-7) represented by the following structures was prepared as a composition with a slightly large Δn.

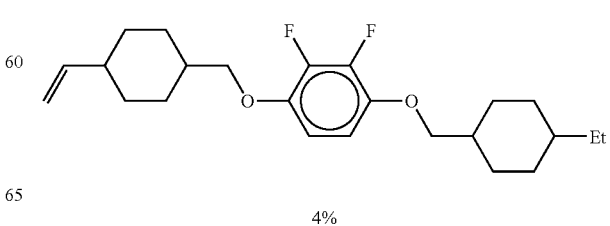

4%

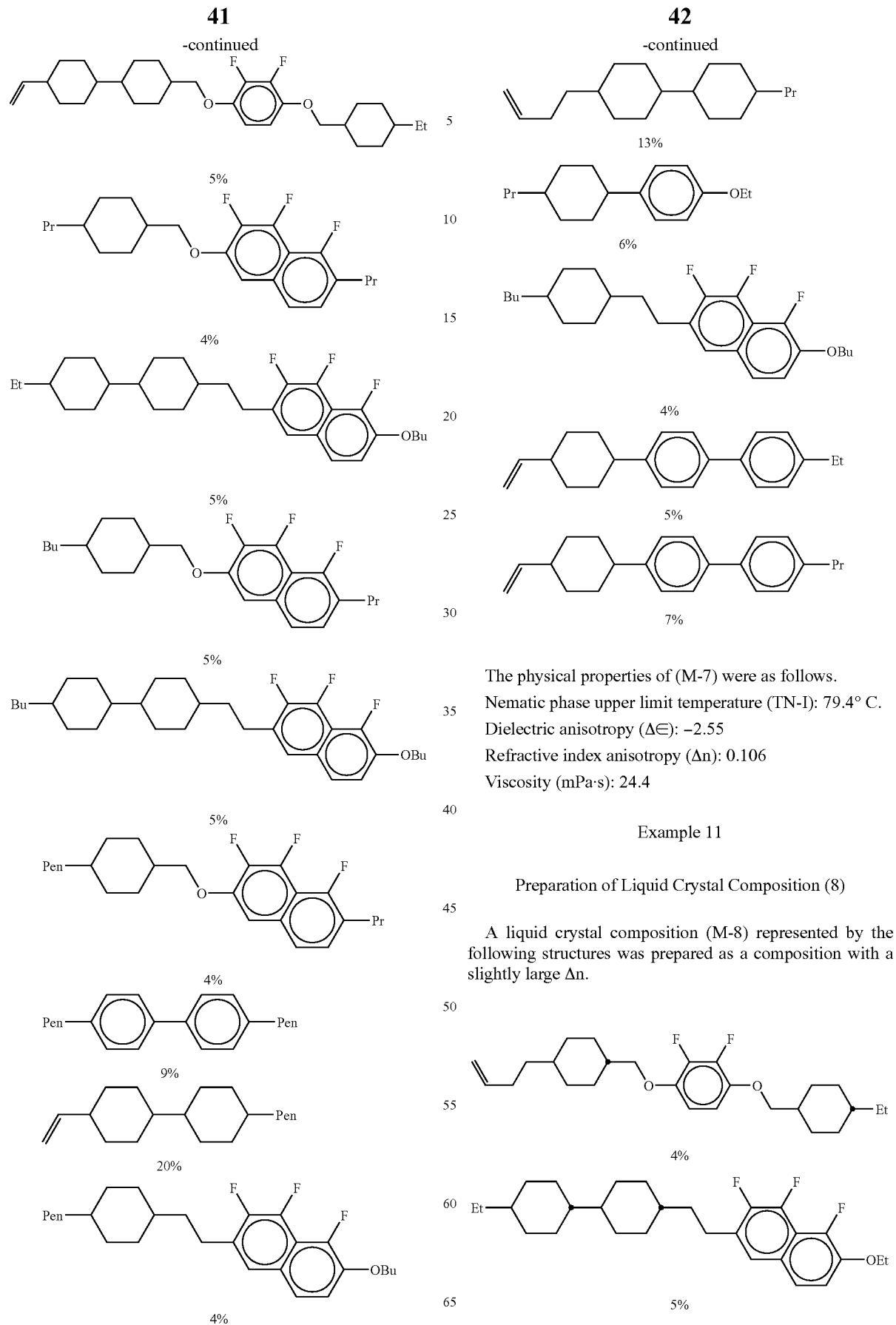
The physical properties of (M-7) were as follows.
Nematic phase upper limit temperature (TN-I): 79.4° C.
Dielectric anisotropy (Δ∈): −2.55
Refractive index anisotropy (Δn): 0.106
Viscosity (mPa·s): 24.4
Example 11
Preparation of Liquid Crystal Composition (8)
A liquid crystal composition (M-8) represented by the following structures was prepared as a composition with a slightly large Δn.
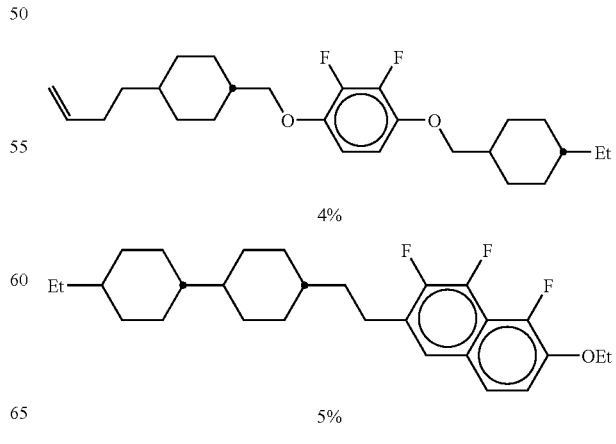

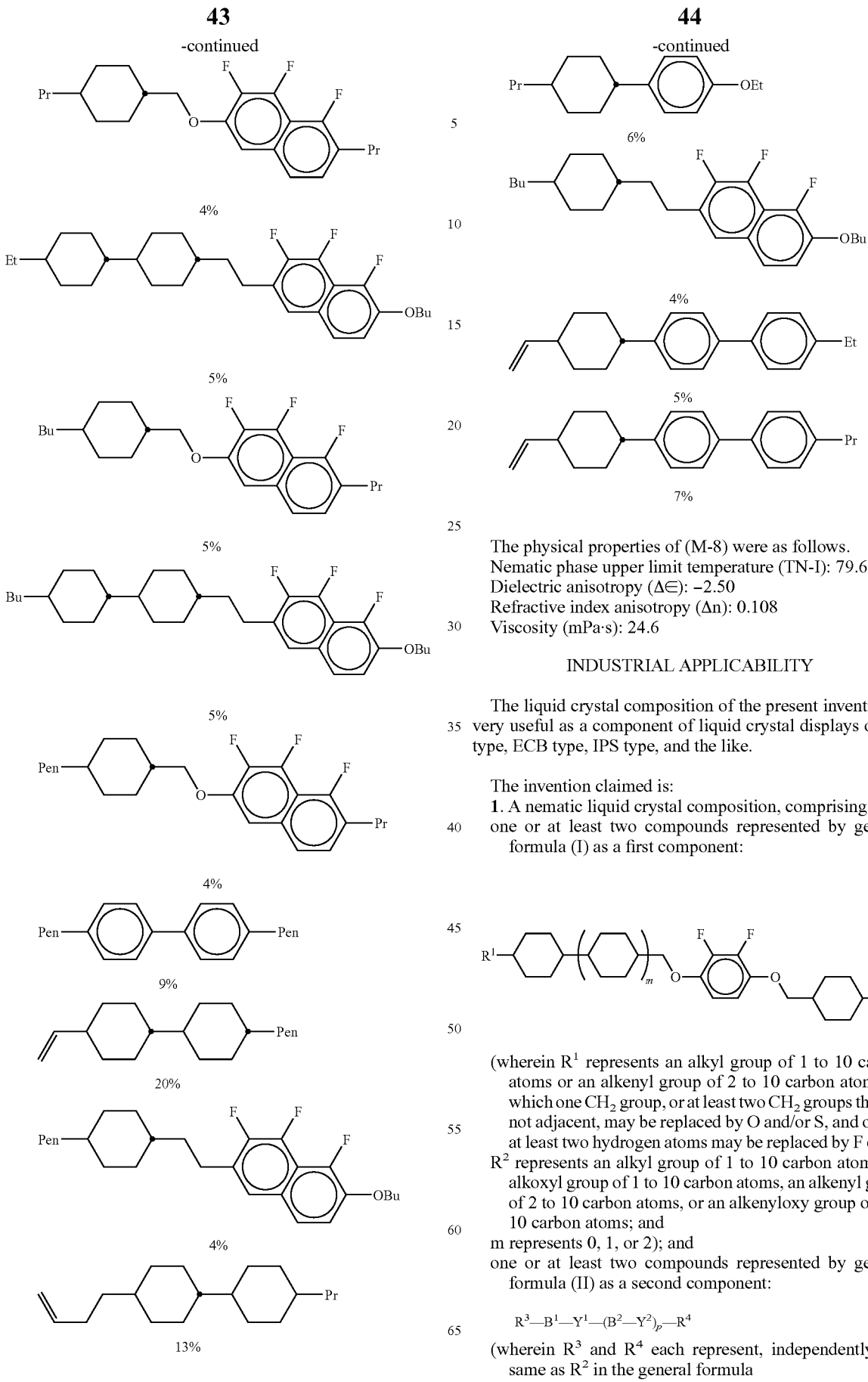

The physical properties of (M-8) were as follows.
Nematic phase upper limit temperature (TN-I): 79.6° C.
Dielectric anisotropy (Δ∈): −2.50
Refractive index anisotropy (Δn): 0.108
Viscosity (mPa·s): 24.6

INDUSTRIAL APPLICABILITY

The liquid crystal composition of the present invention is very useful as a component of liquid crystal displays of VA type, ECB type, IPS type, and the like.

The invention claimed is:
1. A nematic liquid crystal composition, comprising:
one or at least two compounds represented by general formula (I) as a first component:

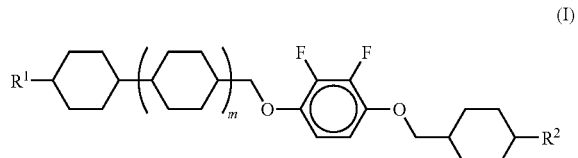

(wherein $R^1$ represents an alkyl group of 1 to 10 carbon atoms or an alkenyl group of 2 to 10 carbon atoms, in which one $CH_2$ group, or at least two $CH_2$ groups that are not adjacent, may be replaced by O and/or S, and one or at least two hydrogen atoms may be replaced by F or Cl; $R^2$ represents an alkyl group of 1 to 10 carbon atoms, an alkoxyl group of 1 to 10 carbon atoms, an alkenyl group of 2 to 10 carbon atoms, or an alkenyloxy group of 3 to 10 carbon atoms; and
m represents 0, 1, or 2); and
one or at least two compounds represented by general formula (II) as a second component:

$$R^3 - B^1 - Y^1 - (B^2 - Y^2)_p - R^4 \quad (II)$$

(wherein $R^3$ and $R^4$ each represent, independently, the same as $R^2$ in the general formula $B^1$ and $B^2$ each represent, independently, a group selected from the group consisting of
(a) a trans-1,4-cyclohexylene group (in which one $CH_2$ group, or at least two $CH_2$ groups that are not adjacent, may be replaced by an oxygen atom or a sulfur atom),
(b) a 1,4-phenylene group (in which one or at least two CH groups may be replaced by a nitrogen atom), and
(c) a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, and a 1,2,3,4-tetrahydronaphthalene-2,6-diyl group, in which a hydrogen atom of the above group (a), group (b), or group (c) may be replaced by halogen;
$Y^1$ and $Y^2$ each represent, independently, —$CH_2CH_2$—, —CH=CH—, —$CH(CH_3)CH_2$—, —$CH_2CH(CH_3)$—, —$CH(CH_3)CH(CH_3)$—, —$CF_2CF_2$—, —CF=CF—, —$CH_2O$—, —$OCH_2$—, —$OCH(CH_3)$—, —$CH(CH_3)O$—, —$(CH_2)_4$—, —$(CH_2)_3O$—, —$O(CH_2)_3$—, —C≡C—, —$CF_2O$—, —$OCF_2$—, —COO—, —OCO—, —COS—, —SCO—, or a single bond;
in the case where pluralities of $Y^2$ and $B^2$ exist, a plurality of $Y^2$ or $B^2$ may be the same or different; and
p represents 0, 1, or 2), wherein
a dielectric anisotropy is negative.

2. The nematic liquid crystal composition according to claim 1, comprising one or at least two compounds selected from the group consisting of compounds represented by general formula (I-A) and general formula (I-B):

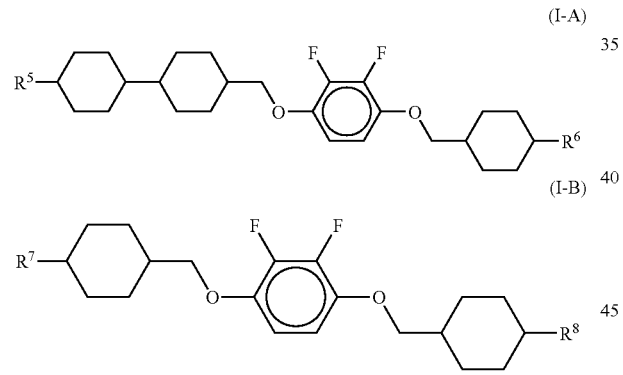

(wherein $R^5$, $R^6$, $R^7$, and $R^8$ represent the same as $R^2$ in the general formula (I)).

3. The nematic liquid crystal composition according to claim 2, comprising one or at least two compounds selected from the group consisting of compounds represented by general formula (II-A) through general formula (II-I):

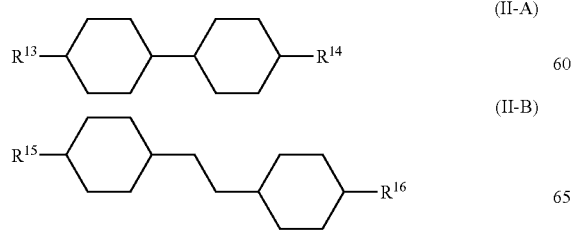
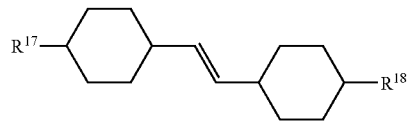
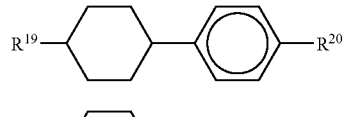
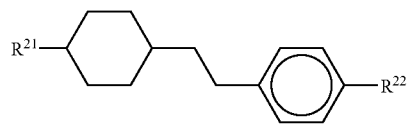
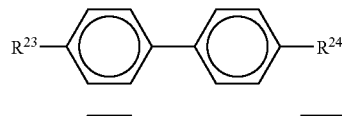
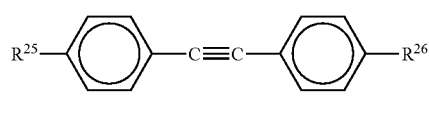
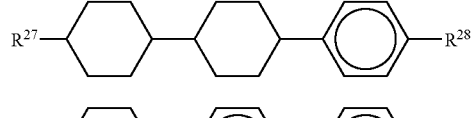

(wherein $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, and $R^{30}$ represent the same as $R^2$ in the general formula (I)).

4. The nematic liquid crystal composition according to claim 3, wherein
one or at least two compounds, which are selected from the group consisting of compounds represented by the general formula (I-A) and the general formula (I-B), are contained at 10 to 80% by mass, and
one or at least two compounds, which are selected from the group consisting of compounds represented by the general formula (II-A) through general formula (II-I), are contained at 20 to 70% by mass.

5. The nematic liquid crystal composition according to claim 4, further comprising one or at least two compounds selected from the group consisting of compounds represented by general formula (III-A) through general formula (III-J):

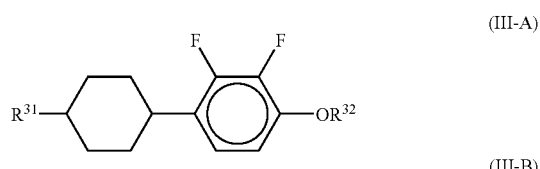
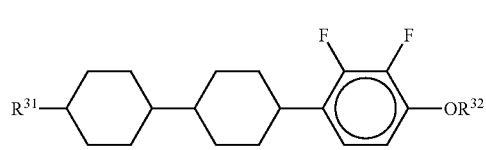

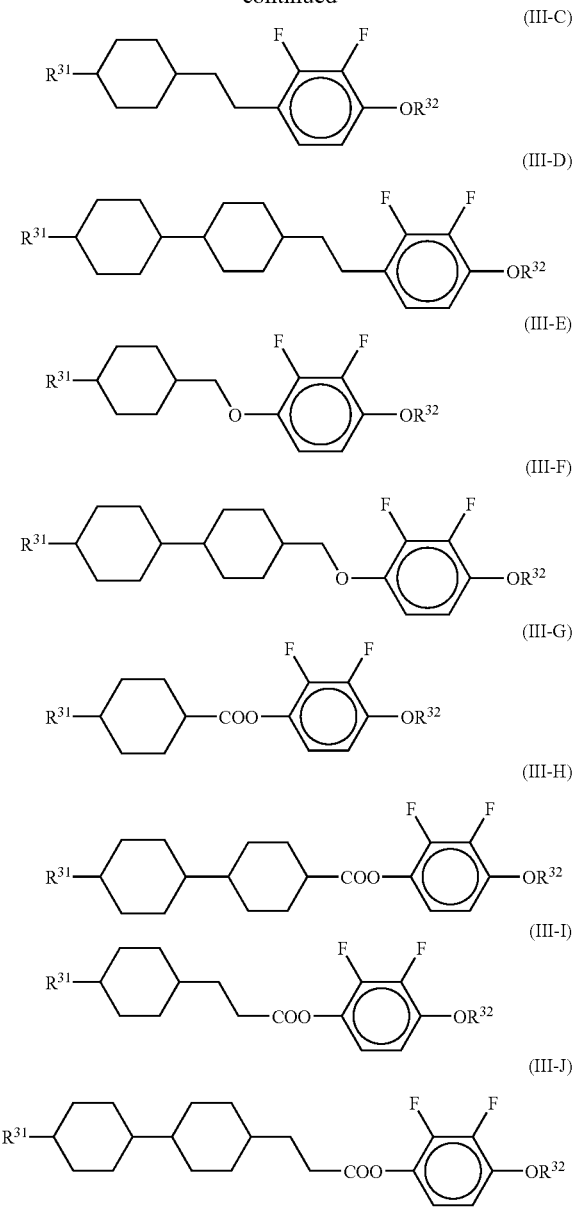

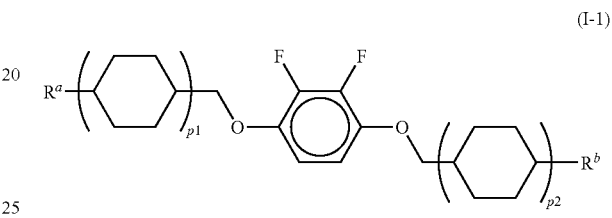

(wherein $R^{31}$ and $R^{32}$ each represent, independently, an alkyl group of 1 to 10 carbon atoms or an alkenyl group of 2 to 10 carbon atoms, in which one $CH_2$ group, or at least two $CH_2$ groups that are not adjacent, may be replaced by O and/or S, and one or at least two hydrogen atoms may be replaced by F or Cl).

6. The nematic liquid crystal composition according to claim 1, wherein a dielectric anisotropy Δ∈ at 25° C. is within a range of −2.0 to −8.0, a refractive index anisotropy Δn at 25° C. is within a range of 0.06 to 0.16, a viscosity at 20° C. is within a range of 10 to 40 mPa·s, and a nematic phase-isotropic liquid phase transition temperature Tni is within a range of 70° C. to 130° C.

7. A difluorobenzene derivative represented by general formula (I-1):

(wherein $R^a$ represents a linear alkenyl group of 2 to 7 carbon atoms, $R^b$ represents a linear alkyl group of 1 to 7 carbon atoms or a linear alkenyl group of 2 to 7 carbon atoms, and p1 and p2 each represent, independently, 1 or 2 in which the sum of p1 and p2 is 3 or less).

8. The difluorobenzene derivative according to claim 7, wherein $R^a$ represents a vinyl group, and $R^b$ represents a linear alkyl group of 1 to 7 carbon atoms in the general formula (I-1).

9. A nematic liquid crystal composition comprising the difluorobenzene derivative according to claim 7.

10. A liquid crystal display element, comprising the nematic liquid crystal composition according to claim 1.

11. A liquid crystal display element for active matrix driving, comprising the nematic liquid crystal composition according to claim 1.

12. A liquid crystal display element for VA mode, IPS mode, or ECB mode, comprising the nematic liquid crystal composition according to claim 1.

\* \* \* \* \*